(12) United States Patent
Mizumoto et al.

(10) Patent No.: US 9,934,779 B2
(45) Date of Patent: Apr. 3, 2018

(54) CONVERSATION ANALYZING DEVICE, CONVERSATION ANALYZING METHOD, AND PROGRAM

(71) Applicant: HONDA MOTOR CO., LTD., Tokyo (JP)

(72) Inventors: Takeshi Mizumoto, Wako (JP); Shunichi Hagiya, Wako (JP); Tomoyuki Sahata, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 15/444,556

(22) Filed: Feb. 28, 2017

(65) Prior Publication Data
US 2017/0263245 A1 Sep. 14, 2017

(30) Foreign Application Priority Data
Mar. 9, 2016 (JP) ................. 2016-046231

(51) Int. Cl.
*G10L 15/00* (2013.01)
*G10L 15/18* (2013.01)
*G10L 15/26* (2006.01)

(52) U.S. Cl.
CPC ........ *G10L 15/1815* (2013.01); *G10L 15/265* (2013.01)

(58) Field of Classification Search
CPC ............... H04L 67/306; H04L 63/0876; G06F 17/3053; G06F 17/30702; G06F 17/30867; G06F 3/167; G06F 17/2785; G06F 17/279; G06F 17/30976; G06F 2203/04808; G06F 3/012; G06F 3/16; G10L 15/22; G10L 25/63; G10L 15/197; G10L 15/285; G10L 15/30; G10L 15/32; G10L 17/10; G10L 25/39; G10L 17/02; G10L 17/06; G10L 17/20; G10L 25/00; G06K 9/00536

See application file for complete search history.

(56) References Cited

U.S. PATENT DOCUMENTS

| | | | | |
|---|---|---|---|---|
| 4,931,934 A * | 6/1990 | Snyder | ............... | G09B 19/00 434/236 |
| 6,011,851 A * | 1/2000 | Connor | ............... | H04S 1/002 379/202.01 |
| 6,151,571 A * | 11/2000 | Pertrushin | ............... | G10L 17/26 704/207 |
| 6,480,826 B2 * | 11/2002 | Pertrushin | ............... | G10L 17/26 704/270 |
| 7,222,075 B2 * | 5/2007 | Petrushin | ............... | G10L 17/26 379/88.01 |

(Continued)

FOREIGN PATENT DOCUMENTS

JP 2016-012216 1/2016

*Primary Examiner* — Michael Ortiz Sanchez
(74) *Attorney, Agent, or Firm* — Rankin, Hill & Clark LLP

(57) ABSTRACT

A conversation data acquiring unit acquires conversation data indicating speech of each speaker in a conversation. A conversation state analyzing unit analyzes an amount of speech of each speaker in the conversation and a degree of influence of the speech of each speaker on the conversation on the basis of the conversation data. A role determining unit determines a role of each speaker in the conversation on the basis of the amount of speech and the degree of influence of the speaker.

11 Claims, 10 Drawing Sheets

(56) References Cited

U.S. PATENT DOCUMENTS

| | | | | |
|---|---|---|---|---|
| 7,475,013 | B2* | 1/2009 | Rifkin | G10L 17/02 |
| | | | | 382/215 |
| 8,666,672 | B2* | 3/2014 | Winarski | A61B 5/16 |
| | | | | 600/301 |
| 8,965,770 | B2* | 2/2015 | Petrushin | G10L 17/26 |
| | | | | 704/270 |
| 9,741,347 | B2* | 8/2017 | Yeracaris | G10L 17/10 |
| 2007/0129942 | A1* | 6/2007 | Ban | G06F 17/241 |
| | | | | 704/235 |
| 2010/0223056 | A1* | 9/2010 | Kadirkamanathan | G10L 15/02 |
| | | | | 704/235 |
| 2014/0258413 | A1* | 9/2014 | Brieskorn | H04M 3/567 |
| | | | | 709/204 |
| 2014/0372362 | A1* | 12/2014 | Miller | G06F 17/00 |
| | | | | 706/50 |
| 2016/0300252 | A1* | 10/2016 | Frank | G06Q 30/0203 |

\* cited by examiner

| Tom | FACILITATOR LEVEL | IDEA PROVIDER LEVEL | DOMINATOR LEVEL |
|---|---|---|---|

| Bob | FACILITATOR LEVEL | IDEA PROVIDER LEVEL | DOMINATOR LEVEL |
|---|---|---|---|

# CONVERSATION ANALYZING DEVICE, CONVERSATION ANALYZING METHOD, AND PROGRAM

CROSS-REFERENCE TO RELATED APPLICATION

Priority is claimed on Japanese Patent Application No. 2016-046231, filed Mar. 9, 2016, the content of which is incorporated herein by reference.

BACKGROUND OF THE INVENTION

Field of the Invention

The present invention relates to a conversation analyzing device, a conversation analyzing method, and a program.

Description of Related Art

A technique of objectively evaluating a degree of excitation in a whole conversation as a part of a proceeding situation of a conversation by detecting an amount of speech of each participant, speech of a specific keyword, and the like in a conversation which is held by a plurality of participants has been proposed. For example, Japanese Unexamined Patent Application, First Publication No. 2016-12216 (hereinafter, Patent Literature 1) discloses a meeting analyzing device that extracts a feature of a time series with proceedings of a meeting from meeting data and calculates a degree of excitation of a time series with the proceedings of the meeting on the basis of the extracted feature. The meeting analyzing device corrects the degree of excitation over the whole meeting in consideration of an overall standard degree of excitation of participants in the meeting. The meeting analyzing device corrects the degree of excitation for each section in which a topic is discussed by considering the standard degree of excitation of some participants on the topic of which some participants participate in discussion. The meeting analyzing device corrects the degree of excitation on the basis of a temper of the participant and speech details thereof for each speech section of each participant in the meeting.

SUMMARY OF THE INVENTION

On the other hand, in a classroom, a company, or another organization, group discussion may be carried out when evaluating persons such as in examination of service. In general, roles of participants are subjectively evaluated by a teacher or an interviewer. As the roles, for example, whether a participant belongs to a core group of a conversation or a non-core group or the like is evaluated. Accordingly, there is a problem in that the proceedings are interrupted for the evaluation and the evaluation results lack objectivity.

However, while the meeting analyzing device described in Patent Literature 1 can acquire a degree of excitation over the whole conversation, the number of speeches of each participant, or the like, the role of each speaker as a participant is not objectively specified from the situation of the conversation.

Aspects of the present invention have been made in consideration of the above-mentioned circumstances and an object thereof is to provide a conversation analyzing device, a conversation analyzing method, and a program that can objectively determine a role of a speaker.

In order to achieve the above-mentioned object, the present invention employs the following aspects.

(1) According to an aspect of the present invention, there is provided a conversation analyzing device including: a conversation data acquiring unit configured to acquire conversation data indicating speech of each speaker in a conversation; a conversation state analyzing unit configured to analyze an amount of speech of each speaker in the conversation and a degree of influence of the speech of each speaker on the conversation on the basis of the conversation data; and a role determining unit configured to determine a role of each speaker in the conversation on the basis of the amount of speech and the degree of influence of the speaker.

(2) In the aspect of (1), an index value of the degree of influence may include a facilitator level which is a degree to which speech of a speaker is facilitated, and the role determining unit may determine whether the role is a facilitator on the basis of the facilitator level.

(3) In the aspect of (2), the facilitator level may be an index value including a speech amount correction level which is a degree to which a deviation in the amount of speech among the speakers is lessened as a component thereof.

(4) In the aspect of (2) or (3), the facilitator level may be an index value including a conversation facilitation frequency which is a speech frequency for facilitating the conversation as a component thereof.

(5) In any one aspect of (1) to (4), an index value of the degree of influence may include an idea provider level including a conversation activity increasing rate which is a degree to which the conversation is activated by speech as a component, and the role determining unit may determine whether the role is an idea provider on the basis of the idea provider level.

(6) In the aspect of (5), the idea provider level may include a conclusion mention level which is a mention frequency of a conclusive element of the conversation as a component.

(7) In any one aspect of (1) to (6), an index value of the degree of influence may include a dominator level indicating an interruption state of speech of another speaker, and the role determining unit determines whether the role is a dominator on the basis of the dominator level.

(8) In any one aspect of (1) to (7), the conversation analyzing device may further include a display data acquiring unit configured to output display data including a diagram collectively indicating magnitudes of index values of the degree of influence and a diagram illustrating a ratio of an amount of speech for each speaker.

(9) In any one aspect of (1) to (8), the conversation analyzing device may further include: a sound collecting unit configured to acquire a plurality of channels of voice signals; and a sound source separating unit configured to separate voice signals associated with speech of each speaker from the plurality of channels of voice signals.

(10) According to another aspect of the present invention, there is provided a conversation analyzing method in a conversation analyzing device, the method including: a conversation data acquiring step of acquiring conversation data indicating speech of each speaker in a conversation; a conversation state analyzing step of analyzing an amount of speech of each speaker in the conversation and a degree of influence of the speech of each speaker on the conversation on the basis of the conversation data; and a role determining step of determining a role of each speaker in the conversation on the basis of the amount of speech and the degree of influence of the speaker.

(11) According to still another aspect of the present invention, there is provided a program causing a computer to perform: a conversation data acquiring sequence of acquiring conversation data indicating speech of each speaker in a conversation; a conversation state analyzing sequence of analyzing an amount of speech of each speaker in the conversation and a degree of influence of the speech of each speaker on the conversation on the basis of the conversation data; and a role determining sequence of determining a role of each speaker in the conversation on the basis of the amount of speech and the degree of influence of the speaker.

According to the aspect of (1), (10), or (11), the role of each speaker is determined on the basis of the amount of speech and the degree of influence which are quantitative index values of the speech of each speaker in a conversation. Accordingly, the role of each speaker is objectively determined. It is possible to eliminate or reduce the operation for determination.

According to the aspect of (2), it is determined whether the role of each speaker is a facilitator on the basis of the degree to which speech is facilitated. Accordingly, it is possible to objectively determine whether the role of each speaker is a facilitator facilitating speech of another speaker.

According to the aspect of (3), it is determined whether the role of each speaker is a facilitator on the basis of the degree to which deviation in the amount of speech among the speakers is lessened. Accordingly, it is possible to accurately determine whether the role of each speaker is a facilitator lessening deviation among the speakers.

According to the aspect of (4), it is determined whether the role of each speaker is a facilitator on the basis of the speech frequency for facilitating the conversation. Accordingly, it is possible to accurately determine whether the role of each speaker is a facilitator facilitating the conversation.

According to the aspect of (5), it is determined whether the role of each speaker is an idea provider on the basis of the degree to which the conversation is activated by speech of the speaker. Accordingly, it is possible to accurately determine whether the role of each speaker is an idea provider speaking to activate the conversation.

According to the aspect of (6), it is determined whether the role of each speaker is an idea provider on the basis of the mention frequency of a conclusive element of the conversation. Accordingly, it is possible to accurately determine whether the role of each speaker is an idea provider speaking to derive the conclusive element of the conversation.

According to the aspect of (7), it is determined whether the role of each speaker is a dominator on the basis of the interruption state of speech of another speaker. Accordingly, it is possible to accurately determine whether the role of each speaker is a dominator dominating discussion in the conversation.

According to the aspect of (8), the diagram collectively indicating magnitudes of the index values of the degree of influence and the diagram illustrating a ratio of an amount of speech for each speaker are displayed. Accordingly, a user can efficiently analyze a role or a tendency in a conversation with reference to the degree of influence of each speaker on the conversation and an amount of speech of each speaker.

According to the aspect of (9), it is possible to acquire voice signals associated with speech of each speaker. Accordingly, it is possible to determine a role based on speech of each speaker in a conversation without causing each speaker to carry a sound collecting unit.

DETAILED DESCRIPTION OF THE INVENTION

Role of Speaker

Figure 1:
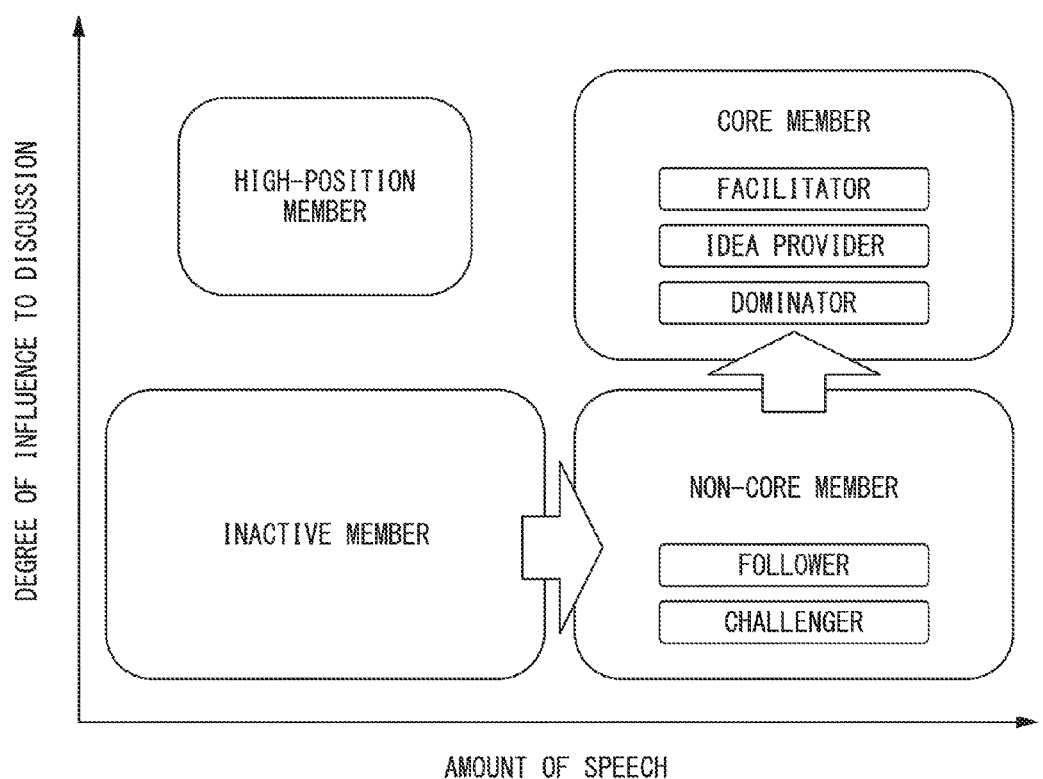
FIG. 1 is a conceptual diagram illustrating an example of roles of speakers in a conversation.

First, a role of a speaker in a conversation will be described below with reference to FIG. 1. FIG. 1 is a conceptual diagram illustrating an example of roles of speakers in a conversation.

Roles of speakers are classified into inactive members, non-core members, and core members. An inactive member is a member who has a smaller amount of speech than the other roles and who has a lower degree of influence on discussion in a conversation. An inactive member is a member who does not participate substantially in a conversation. An inactive member is also referred to as an inactive participant. A degree of influence refers to a degree of contribution to a conversation with another speaker. A non-core member is a member who has a larger amount of speech than an inactive member but who has a low degree of influence on discussion in a conversation similarly to an inactive member. A non-core member is a member who can be said to participate in a conversation but who has a substantially small degree of contribution to the conversation and a low degree of influence on another speaker. A non-core member is also referred to as a peripheral member. A core member is a member who has a larger amount of speech than an inactive member and who has a substantially high degree of influence on a conversation. A core member is also referred to as a main member.

The roles of speakers further include high-position members. A high-position member is a member who does not actively speak but who has a high degree of influence on the conversation. The influence of a high-position member on the conversation is based on information other than speech, such as a height of a social position or an abundant amount of knowledge on a topic. A high-position member is also referred to as an authority.

Therefore, a conversation analyzing system 1 according to this embodiment (refer to FIG. 2) analyzes an amount of speech of each speaker in a conversation and a degree of influence of the speech of each speaker on the conversation on the basis of conversation data indicating the speech of each speaker in the conversation. The conversation analyzing system 1 determines a role of each speaker in the conversation on the basis of the analyzed amount of speech of the speaker and the analyzed degree of influence of the speaker.

Non-core members are further classified into followers and challengers. A follower is a member who follows speech of another speaker and who does not actively participate in discussion. A follower often gives short speech indicating an emotion such as enthusiastic agreement as a response to speech of another speaker. A challenger is a member who participates in discussion but who does not influence the discussion such as by concluding the conversation.

Therefore, the conversation analyzing system 1 determines whether a role of a speaker determined to be a non-core member is a follower or a challenger on the basis of a speech time of each speaker.

Core members are further classified into facilitators, idea providers, and dominators. A facilitator is a member who facilitates discussion to equalize speech among all speakers as much as possible. An idea provider is a member who speaks to provide a topic activating discussion. A dominator is a member who dominates discussion by interrupting speech of another speaker.

The conversation analyzing system 1 calculates a facilitator level, an idea provider level, and a dominator level as index values for determining the roles and determines whether the role of a speaker determined to be a core member is a facilitator, an idea provider, or a dominator on the basis of the calculated index values.

Embodiments of the present invention will be described below with reference to the accompanying drawings.

Figure 2:
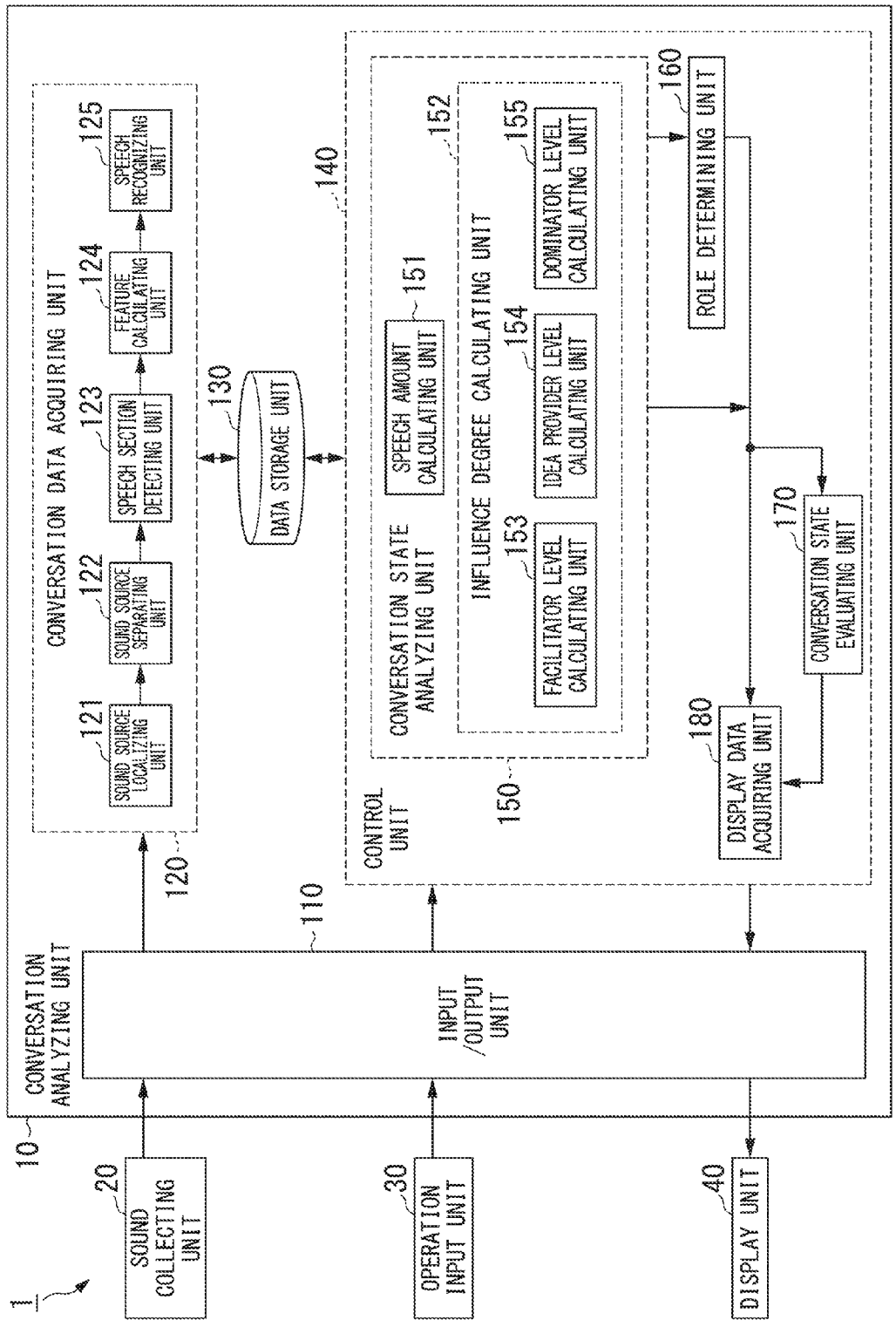
FIG. 2 is a block diagram illustrating a configuration of a conversation analyzing system according to an embodiment of the present invention.

FIG. 2 is a block diagram illustrating a configuration of a conversation analyzing system 1 according to an embodiment of the present invention.

The conversation analyzing system 1 includes a conversation analyzing device 10, a sound collecting unit 20, an operation input unit 30, and a display unit 40.

The conversation analyzing device 10 acquires conversation data indicating speech of each speaker in a conversation from voice signals input from the sound collecting unit 20 and analyzes an amount of speech of each speaker in the conversation and a degree of influence of each speaker on the conversation on the basis of the acquired conversation data. The conversation analyzing device 10 determines a role of each speaker in the conversation on the basis of the analyzed amount of speech and the analyzed degree of influence for each speaker.

The sound collecting unit 20 collects arriving sound and generates M (where M is an integer equal to or greater than 2) channels of voice signals based on the collected sound. The sound collecting unit 20 is a microphone array which includes, for example, M microphones as a sound collecting element and in which the microphones are arranged at different positions. The sound collecting unit 20 outputs the generated M channels of voice signals to the conversation analyzing device 10.

The operation input unit 30 receives a user's operation and generates an operation signal based on the received operation. The operation input unit 30 outputs the generated operation signal to the conversation analyzing device 10. The operation input unit 30 includes any one of physical members such as a button and a lever and general-purpose members such as a touch sensor, a mouse, and a keyboard or a combination thereof.

The display unit 40 displays an image based on an image signal input from the conversation analyzing device 10. For example, the display unit 40 includes any one of a liquid crystal display (LCD) and an organic electroluminescence (EL) display. The input image signal is, for example, display data indicating various types of display screens.

A configuration of the conversation analyzing device 10 according to the embodiment will be described below.

The conversation analyzing device 10 includes an input/output unit 110, a conversation data acquiring unit 120, a data storage unit 130, and a control unit 140. The conversation analyzing device 10 may be constituted by dedicated hardware or may be embodied by performing a process instructed by commands described in a predetermined program on general-purpose hardware. The conversation analyzing device 10 may be constituted, for example, using an electronic device such as a personal computer, a mobile phone (which includes a so-called a smartphone), or a tablet terminal as the general-purpose hardware.

The input/output unit 110 is connected to another device in a wireless or wired manner, and inputs and outputs various types of data or signals from and to the connected device. The input/output unit 110 outputs the voice signals input from the sound collecting unit 20 to the conversation data acquiring unit 120 and outputs the operation signal input from the operation input unit 30 to the control unit 140. The input/output unit 110 output the image signal input from the control unit 140 to the display unit 40. The input/output unit 110 is, for example, a data input/output interface.

The conversation data acquiring unit 120 acquires conversation data indicating speech of each speaker from the M channels of voice signals input from the sound collecting unit 20 via the input/output unit 110. Information on the speech of each speaker includes a speech section which is a time in which speech is produced and speech details for each speech section. The conversation data acquiring unit 120 includes a sound source localizing unit 121, a sound source separating unit 122, a speech section detecting unit 123, a feature calculating unit 124, and a voice recognizing unit 125.

The sound source localizing unit 121 calculates a direction of each sound source on the basis of the M channels of voice signals input from the input/output unit 110 for every time of a predetermined length (for example, 50 ms). The sound source localizing unit 121 uses, for example, a multiple signal classification (MUSIC) method to calculate a sound source direction. The sound source localizing unit 121 outputs sound source direction information indicating the calculated sound source direction of each sound source and the M channels of voice signals to the sound source separating unit 122.

The M channels of voice signals and the sound source direction information are input to the sound source separating unit 122 from the sound source localizing unit 121. The sound source separating unit 122 separates a sound-source voice signal for each sound source from the M channels of voice signals on the basis of the sound source directions indicated by the sound source direction information. The sound source separating unit 122 uses, for example, geometric-constrained high-order decorrelation-based source separation (GHDSS) method to separate the sound sources. The sound source separating unit 122 outputs the sound-source voice signals for each separated sound source to the speech section detecting unit 123. Each speaker is treated as a sound source vocalizing by producing speech. In other words, the sound-source voice signal is a voice signal indicating voice produced by each speaker.

The speech section detecting unit 123 detects a speech section for each section of a predetermined time interval from the sound-source voice signal for each speaker input from the sound source separating unit 122. The speech section detecting unit 123 performs voice activity detection (VAD) using a method such as a zero crossing method or a spectrum entropy method at the time of specifying a speech section. The speech section detecting unit 123 defines a section specified to be a voice activity section as a speech section and generates speech section data indicating whether a section is a speech section for each speaker. The speech section detecting unit 123 outputs the speech section data and the sound-source voice signal to the feature calculating unit 124 in correlation with each other for each speech section.

The speech section data and the sound-source voice signal for each speaker are input to the feature calculating unit 124 from the speech section detecting unit 123. The feature calculating unit 124 calculates an acoustic feature from the voice signal in each speech section with reference to the speech section data for every predetermined time interval (for example, 10 ms). An acoustic feature includes, for example, a 13-dim mel-scale logarithmic spectrum (MSLS). One set of acoustic features may include a 13-dim delta MSLS or delta power. The delta MSLS is a difference between the MSLS of a frame at that time (current time) and the MSLS of a previous frame (previous time). The delta power is a difference between power at the current time and power at the previous time. The acoustic feature is not limited thereto, but may be, for example, mel-frequency cepstrum coefficients (MFCCs). The feature calculating unit 124 outputs the calculated acoustic feature and the speech section data to the voice recognizing unit 125 in correlation with each other for each speech section.

The voice recognizing unit 125 performs a voice recognizing process on the acoustic feature input from the feature calculating unit 124 using voice recognition data stored in advance in the data storage unit 130 and generates text data indicating speech details. The voice recognition data is data which is used for the voice recognizing process and includes, for example, an acoustic model, a language model, and a word dictionary. The acoustic model is data which is used to recognize phonemes from the acoustic feature. The language model is data which is used to recognize one or more word sets from a phoneme sequence including one or more neighboring phonemes. The word dictionary is data indicating words which are candidates for the phoneme sequence. The recognized one or more word sets are expressed in text data as recognized data. The acoustic model is, for example, a continuous hidden Markov model (HMM). The continuous HMM is a model in which an output distribution density is a continuous function, and the output distribution density is expressed by weighted addition using a plurality of normal distributions as a base. The language model is, for example, an N-gram indicating a constraint of a phoneme sequence including phonemes subsequent to a certain phoneme or a transition probability of each phoneme sequence.

The voice recognizing unit 125 generates conversation data by correlating the text data generated for each sound source, that is, for each speaker, and the speech section data with each other for each speech section of each speaker. The voice recognizing unit 125 stores the conversation data generated for each speaker in the data storage unit 130.

The data storage unit 130 stores various types of data which are used for processes which are performed by the conversation analyzing device 10 and various types of data generated through the processes. In the data storage unit 130, for example, the voice recognition data and the conversation data for each speaker are stored for each session. A session refers to an individual conversation. In the following description, a conversation refers to a speech set among three or more speakers associated with a common topic. That is, one session of conversation normally includes a plurality of utterances. In the following description, a conversation includes a meeting, a round-table talk, a discussion, and the like, which are generically referred to as a conversation. The conversation data for each session may include date and time data indicating a start date and time, an end date and time, or duration of the session. Unless otherwise mentioned, a conversation refers to a conversation of one session. The data storage unit 130 includes various storage mediums such as a random access memory (RAM) and a read-only memory (ROM).

The control unit 140 includes a conversation state analyzing unit 150, a role determining unit 160, a conversation state evaluating unit 170, and a display data acquiring unit 180.

The conversation state analyzing unit 150 reads conversation data from the data storage unit 130 and analyzes an amount of speech of each speaker and a degree of influence of the speech of each speaker on a conversation on the basis of the speech section and the speech details of each speaker indicated by the read conversation data. The conversation state analyzing unit 150 outputs conversation state data indicating the amount of speech and the degree of influence as index values of the conversation data acquired by analysis to the role determining unit 160, the conversation state evaluating unit 170, and the display data acquiring unit 180. The conversation state analyzing unit 150 may specify conversation data associated with a conversation designated by an operation signal input from the operation input unit 30 as conversation data to be read.

The conversation state analyzing unit 150 includes a speech amount calculating unit 151 and an influence degree calculating unit 152.

Figure 4:
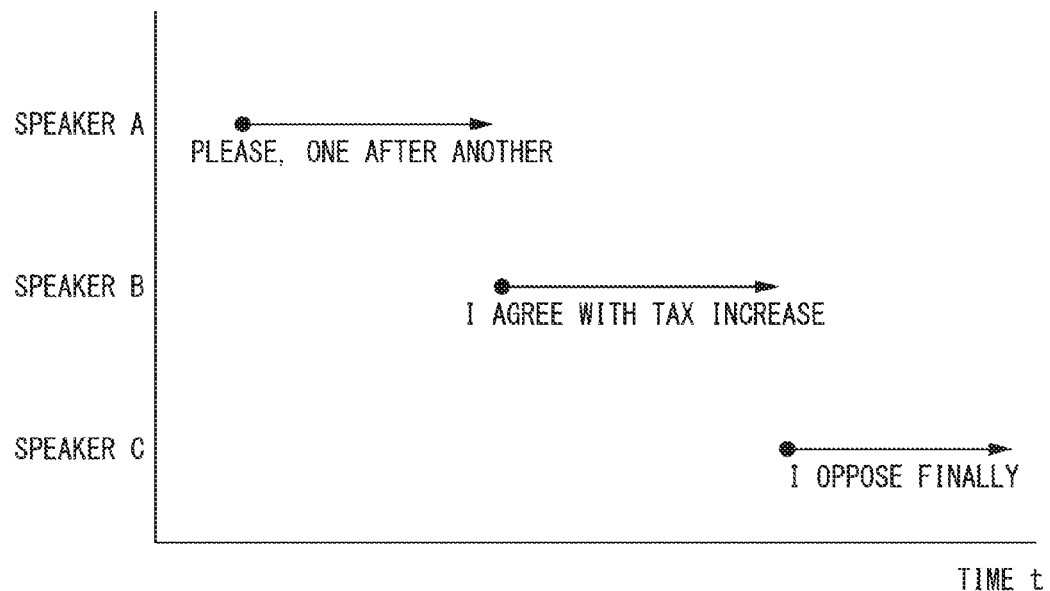
FIG. 4 is a diagram illustrating an example of a speech section for each speaker in a conversation.

The speech amount calculating unit 151 calculates an amount of speech of each speaker on the basis of the speech section of each speaker indicated by the read conversation data. The amount of speech is an index of speech activity in a conversation. For example, the amount of speech is a total speech time which is the total sum of speech times in a conversation. The speech time is a time from a start time of each speech section to an end time thereof. In the example illustrated in FIG. 4, a time indicated by a start point of each arrow and a time indicated by an end point thereof correspond to a start time and an end time of each speech section, respectively. The amount of speech may be the number of utterances which are the number of speech sections in a conversation. The speech amount calculating unit 151 calculates an average speech time which is an average time of speech times for each utterance in a conversation for each speaker. The speech amount calculating unit 151 outputs speech amount data indicating the calculated amount of speech of each speaker and the calculated average speech time of each speaker to the role determining unit 160, the conversation state evaluating unit 170, and the display data acquiring unit 180. Details of the amount of speech will be described later.

The influence degree calculating unit 152 calculates a degree of influence of each speaker on the basis of the speech section and the speech details of each speaker indicated by the read conversation data. The larger the value of the degree of influence becomes, the higher the degree of influence becomes. The influence degree calculating unit 152 includes a facilitator level calculating unit 153 that calculates a facilitator level as an index of the degree of influence, an idea provider level calculating unit 154 that calculates an idea provider level as an index of the degree of influence, and a dominator level calculating unit 155 that calculates a dominator level as an index of the degree of influence.

The facilitator level calculating unit 153 calculates a facilitator level of each speaker with reference to the read conversation data, that is, conversation data associated with a conversation to be analyzed, and conversation data associated with a conversation previous to the conversation. In the following description, a session to be analyzed at that time may be referred to as "current" or "a current conversation" and a conversation previous to the conversation to be analyzed may be referred to as "previous" or "a previous conversation." Participants in a previous conversation to be referred to may not be completely equal to participants in a current conversation as long as some of the participants in the current conversation are included therein.

The facilitator level is an index value indicating a degree to which speech of another speaker is facilitated in the current conversation. Another speaker whose speech is facilitated may be a specific different speaker or an unspecified different speaker. The facilitator level includes a speech amount correction level as a component thereof. The speech amount correction level is an index value indicating a degree to which deviation in an amount of speech among the speakers is lessened. That is, the facilitator level indicates a degree to which an amount of speech of a speaker other than a target speaker to be calculated is corrected from a natural state in which the target speaker does not participate to an ideal state in which the amounts of speech are equal to each other. In this embodiment, the facilitator level calculating unit 153 calculates an average amount of speech of each speaker in a previous conversation as an amount of speech in the natural state. Regarding the amount of speech in the ideal state, it is assumed that the amounts of speech of the speakers are equal to each other. The previous conversation used to calculate the facilitator level does not include the target speaker but may be limited to a conversation in which another speaker is included as a participant. Accordingly, the facilitator level is calculated as an index of the target speaker's ability using a conversation which is not influenced by the target speaker.

The facilitator level may include a conversation facilitation speech frequency as another component. The conversation facilitation speech frequency refers to a frequency of speech (hereinafter referred to as conversation facilitation speech) for facilitating speech of another speaker and facilitating a current conversation. In the example illustrated in FIG. 4, speech of Speaker A, "Please, one after another," corresponds to a conversation facilitation speech. At times after the conversation facilitation speech, speech of Speaker B, "I agree with a tax increase," and speech of Speaker C, "I oppose finally," are facilitated.

Therefore, phrases indicating the conversation facilitation speech may be stored in advance in a word dictionary in the data storage unit 130. The facilitator level calculating unit 153 specifies a conversation facilitation speech from the speech details indicated by the text data of each speaker indicated by the conversation data with reference to the word dictionary stored in the data storage unit 130. In specifying the conversation facilitation speech, the facilitator level calculating unit 153 may use a technique such as keyword spotting or DP matching. The facilitator level calculating unit 153 counts the number of conversation facilitation utterances specified and acquires a conversation facilitation speech frequency. The facilitator level calculating unit 153 outputs facilitator level data indicating the calculated facilitator level of each speaker to the role determining unit 160, the conversation state evaluating unit 170, and the display data acquiring unit 180. Details of the facilitator level will be described later.

The idea provider level calculating unit 154 calculates an idea provider level for each speaker on the basis of the read conversation data. The idea provider level is an index value indicating a degree by which a conversation is more activated by speech than before the speech. The idea provider level includes an activity increasing rate as a component thereof.

The activity increasing rate is an average value of activity variation rates of the speech of each speaker in a session to be analyzed. The activity variation rate is a variation rate of conversation activity in a predetermined period after the speech to conversation activity in a predetermined period (for example, 30 seconds) before the speech. For example, an amount of speech can be used as an index of conversation activity.

The idea provider level may include a non-conversation time as a negative component thereof. The negative component refers to a factor for decreasing a degree thereof. The non-conversation time is an average time between utterances in a period from each utterance of a speaker to a next utterance in a session to be analyzed. The next speech is given by another speaker. The longer the non-conversation time becomes, the smaller the idea provider level becomes.

Figure 6:
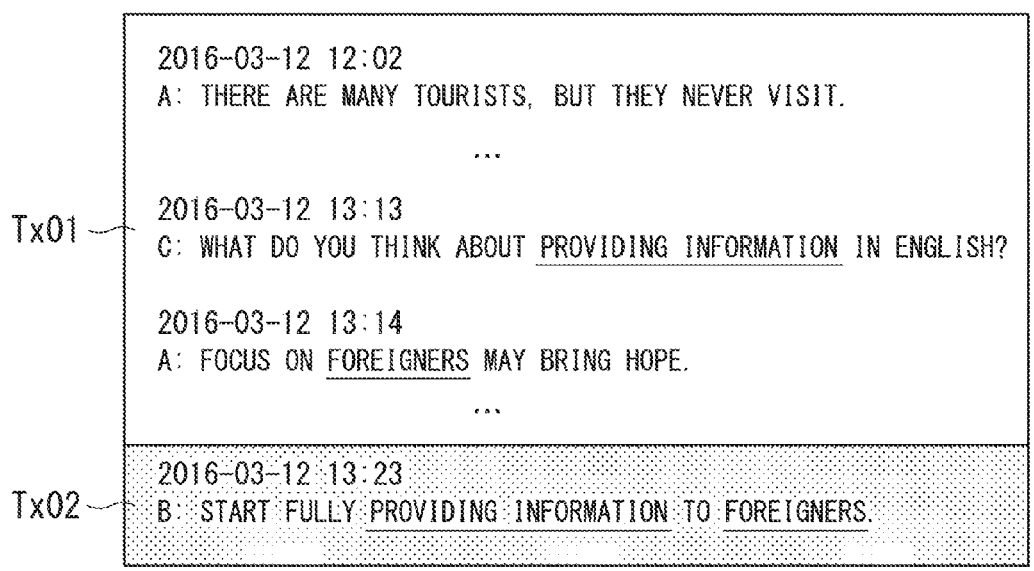
FIG. 6 is a diagram illustrating a conclusion mention level.

The idea provider level may include a conclusion mention level as a component thereof. The conclusion mention level is the frequency in which keywords included in a conclusion sentence indicating a conclusion of a meeting are included in the speech of the speaker. A keyword is a phrase necessary for expressing conclusive elements and is mainly constituted by an independent word. In the example illustrated in FIG. 6, among the keywords "foreigner," "provision of information," and "fullness," included in a conclusion sentence Tx02 uttered by Speaker B, "provision of information" included in speech of Speaker C in discussion Tx01 which comes to the conclusion is counted once. The idea provider level calculating unit 154 may select a conclusion sentence in the conversation, for example, on the basis of an operation signal input from the operation input unit 30 by a user's operation. The idea provider level calculating unit 154 may select a conclusion sentence in the conversation from speech details indicated by speech data using an existing language processing technique.

The idea provider level calculating unit 154 outputs idea provider level data indicating the calculated idea provider level of each speaker to the role determining unit 160, the conversation state evaluating unit 170, and the display data acquiring unit 180. Details of the idea provider level will be described later.

The dominator level calculating unit 155 calculates a dominator level of each speaker on the basis of the read conversation data. The dominator level is an index value indicating an interruption state of another speaker by speech of a speaker as a calculation target. The dominator level includes a successful interrupt frequency of another speaker by a target speaker and a failed interrupt frequency of a target speaker by another speaker as a component thereof. The dominator level includes a failed interrupt frequency of another speaker by a target speaker and a successful interrupt frequency of a target speaker by another speaker as a negative component thereof. The dominator level may include an amount of speech in the conversation in a predetermined time (for example, 30 seconds) from an end of interrupted speech as a component thereof.

The dominator level calculating unit 155 outputs dominator level data indicating the calculated dominator level of each speaker to the role determining unit 160, the conversation state evaluating unit 170, and the display data acquiring unit 180. Details of the dominator level will be described later.

The speech amount data, the facilitator level data, the idea provider level data, and the dominator level data are input to the role determining unit 160 from the speech amount calculating unit 151, the facilitator level calculating unit 153, the idea provider level calculating unit 154, and the dominator level calculating unit 155, respectively. The role determining unit 160 determines a role of each speaker in a session to be analyzed using the speech amount data, the facilitator level data, the idea provider level data, and the dominator level data. The role determining unit 160 outputs role data indicating the determined role to the conversation state evaluating unit 170 and the display data acquiring unit 180. Processes associated with the role determination will be described later.

The speech amount data, the facilitator level data, the idea provider level data, and the dominator level data are input to the conversation state evaluating unit 170 from the speech amount calculating unit 151, the facilitator level calculating unit 153, the idea provider level calculating unit 154, and the dominator level calculating unit 155, respectively.

The conversation state evaluating unit 170 evaluates the conversation state which is analyzed by the conversation state analyzing unit 150 on the basis of a variety of input data. Information indicating the conversation state acquired by the evaluation includes time-series information, whole information, and various index values of the conversation state. The conversation state evaluating unit 170 outputs conversation state data indicating the conversation state to the display data acquiring unit 180. Examples of information indicating the conversation state will be described later.

The speech amount data, the facilitator level data, the idea provider level data, and the dominator level data are input to the display data acquiring unit 180 from the speech amount calculating unit 151, the facilitator level calculating unit 153, the idea provider level calculating unit 154, and the dominator level calculating unit 155, respectively. The conversation state data is also input to the display data acquiring unit 180 from the conversation state evaluating unit 170. The display data acquiring unit 180 generates display data on the basis of a variety of input data. The display data is data indicating display information. The display information includes, for example, one or both of a diagram indicating a ratio of the facilitator level, the idea provider level, and the dominator level and a diagram indicating an amount of speech of each speaker. The display data acquiring unit 180 displays the display information by outputting the generated display data to the display unit 40 via the input/output unit 110.

Determination of Role

Figure 3:
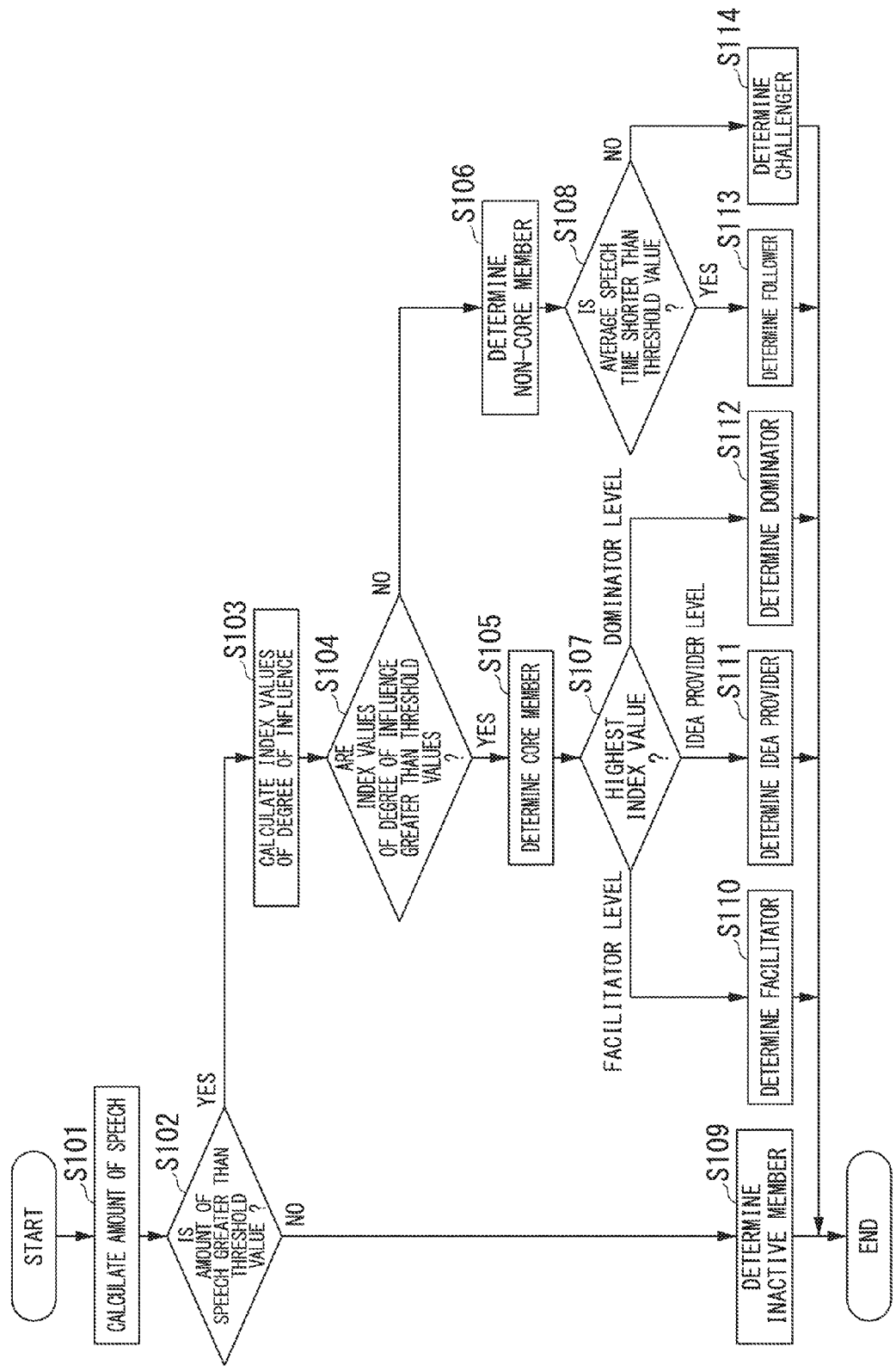
FIG. 3 is a flowchart illustrating a role determining process according to the embodiment.

Processes associated with the determination of role which is mainly performed by the role determining unit 160 will be described. FIG. 3 is a flowchart illustrating the determination of role according to this embodiment. The following processes are performed for each speaker.

(Step S101) The speech amount calculating unit 151 reads conversation data associated with a conversation to be analyzed from the data storage unit 130 and calculates an amount of speech and an average speech time for each speaker. Thereafter, the process of Step S102 is performed.

(Step S102) The role determining unit 160 determines whether an amount of speech of a speaker is greater than a predetermined threshold value for the amount of speech. When it is determined that the amount of speech of a speaker is greater than the predetermined threshold value for the amount of speech (YES in Step S102), the process of Step S103 is performed. When it is determined that the amount of speech of a speaker is equal to or less than the predetermined threshold value for the amount of speech (NO in Step S102), the process of Step S109 is performed.

(Step S103) The influence degree calculating unit 152 calculates the facilitator level, the idea provider level, and the dominator level as index values of the degree of influence. Thereafter, the process of Step S104 is performed.

(Step S104) The role determining unit 160 determines whether the index values of the facilitator level, the idea provider level, and the dominator level as the index values of the degree of influence are greater than threshold values for the index values, respectively. When it is determined that any one index value is greater than the threshold value for the index value (YES in Step S104), the process of step S105 is performed. When it is determined that any index value is not greater than the threshold value for the index value (NO in Step S104), the process of Step S106 is performed.

(Step S105) The role determining unit 160 determines that the role of the corresponding speaker is a core member. Thereafter, the process of Step S107 is performed.

(Step S106) The role determining unit 160 determines that the role of the corresponding speaker is a non-core member. Thereafter, the process of Step S108 is performed.

(Step S107) The role determining unit 160 determines the highest index value of the facilitator level, the idea provider level, and the dominator level. When the highest index value is the facilitator level (facilitator level in Step S107), the process of Step S110 is performed. When the highest index value is the idea provider level (idea provider level in Step S107), the process of Step S111 is performed. When the highest index value is the dominator level (dominator level in Step S107), the process of Step S112 is performed.

(Step S108) The role determining unit 160 determines whether an average speech time is shorter than a predetermined threshold value for the average speech time (for example, 5 seconds to 10 seconds). When it is determined that the average speech time is shorter than the predetermined threshold value (YES in Step 108), the process of Step S113 is performed. When it is determined that the average speech time is not shorter than the predetermined threshold value (NO in Step S108), the process of Step S114 is performed.

(Step S109) The role determining unit 160 determines that the role of the corresponding speaker is an inactive member. Thereafter, the process flow illustrated in FIG. 3 ends.

(Step S110) The role determining unit 160 determines that the role of the corresponding speaker is a facilitator. Thereafter, the process flow illustrated in FIG. 3 ends.

(Step S111) The role determining unit 160 determines that the role of the corresponding speaker is an idea provider. Thereafter, the process flow illustrated in FIG. 3 ends.

(Step S112) The role determining unit 160 determines that the role of the corresponding speaker is a dominator. Thereafter, the process flow illustrated in FIG. 3 ends.

(Step S113) The role determining unit 160 determines that the role of the corresponding speaker is a follower. Thereafter, the process flow illustrated in FIG. 3 ends.

(Step S114) The role determining unit 160 determines that the role of the corresponding speaker is a challenger. Thereafter, the process flow illustrated in FIG. 3 ends.

Speech Time

A speech time which is used as a basis of the amount of speech or the average speech time which is calculated by the speech amount calculating unit 151 will be described below. A speech section indicated by speech data is specified by a speech start time and a speech end time. The speech time is a time from the speech start time to the speech end time.

Figure 5:
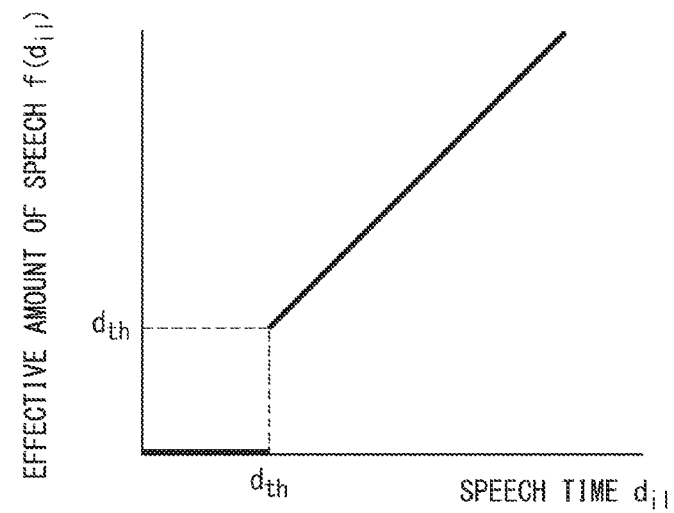
FIG. 5 is a diagram illustrating an example of treatment of a speech time.

The speech amount calculating unit 151 determines an effective amount of speech f(d) which is an actual part of speech from the speech time d for each specified speech section. In the example illustrated in FIG. 5, a speech time $d_{il}$ associated with an l-th (where l is an integer equal to or greater than 1) speech of Speaker i is less than a lower limit $d_{th}$ of a predetermined speech time, the speech amount calculating unit 151 sets the effective amount of speech $f(d_{il})$ corresponding to the speech time $d_{il}$ to 0 and dismisses speech of which the effective amount of speech $f(d_{il})$ is 0. In speech of which the speech time $d_{il}$ is equal to or greater than the lower limit $d_{th}$, the lower limit $d_{th}$ of the speech times which are employed to calculate the amount of speech and the average speech time by the speech amount calculating unit 151 is, for example, 2 seconds. Accordingly, since a section determined to be a speech section of which the speech time is less than the lower limit $d_{th}$ is excluded, noise such as sound determined to be speech is excluded.

Facilitator Level

The method of calculating a facilitator level f will be described below.

The facilitator level calculating unit 153 calculates a normalized speech amount correction level $f_1'$, for example, using a relationship expressed by Equation (1). The speech amount correction level $f_1'$ is a component of the facilitator level f.

$$f_1' = 1 - e^{-f_1}, \quad (1)$$
$$f_1 = \frac{v}{v_n + 1}$$

In Equation (1), v denotes a variance of the amounts of speech among the speakers in a current conversation, and $v_n$ denotes a variance of the amounts of speech among the speakers in a previous conversation. The speech amount correction level $f_1$ before normalization is calculated by dividing the variance v by a value obtained by adding 1 to the variance $v_n$. The ranges of the variances v and $v_n$ are real numbers greater than 0. The greater the role of the facilitator becomes, the smaller the variance v becomes and thus the speech amount correction level $f_1$ before normalization decreases to be close to 0. The less the role of the facilitator becomes, the greater the variance v becomes and thus the speech amount correction level $f_1$ before normalization increases to be close to ∞. 1 is a real number which is added to prevent the denominator from being 0. Equation (1) represents that the speech amount correction level $f_1'$ is normalized by deducting an exponential function value $e^{-f_1}$ of a value $-f_1$, which is obtained by inverting the sign of the speech amount correction level $f_1$ before normalization, from 1. The range of the speech amount correction level $f_1'$ is from 0 to 1. The speech amount correction level $f_1'$ has a larger value as the role of the facilitator becomes larger, and has a smaller value as the role of the facilitator becomes smaller.

The facilitator level calculating unit 153 calculates the variances v and $v_n$, for example, using relationships expressed by Equations (2) and (3).

$$v = \frac{1}{K} \sum_{i=i_1,\ldots,i_K} (u_i - U/K)^2 \quad (2)$$

$$v_n = \frac{1}{K} \sum_{i=i_1,\ldots,i_K} (\langle u_i \rangle - \langle U \rangle / K)^2 \quad (3)$$

In Equations (2) and (3), K denotes the number of speakers in each conversation. Here, i is an index indicating a speaker and $i_1, \ldots, i_K$ are indices for identifying K speakers. In addition, $u_i$ denotes an amount of speech of Speaker i. U denotes an average amount of speech of K speakers. $\langle \ldots \rangle$ denotes an average value of index values . . . in each conversation.

The facilitator level calculating unit 153 calculates a normalized conversation facilitation speech frequency $f_2'$ by dividing the conversation facilitation speech frequency of each speaker in the current conversation by the speech frequency of the speaker. The conversation facilitation speech frequency $f_2'$ is another component of the facilitator level f. The conversation facilitation speech frequency $f_2'$ also ranges from 0 to 1.

As expressed by Equation (4), the facilitator level calculating unit 153 calculates the sum of multiplied values, which are obtained by multiplying the speech amount correction level $f_1'$ and the conversation facilitation speech frequency $f_2'$ by predetermined weighting factors $w_{1,f}$ and $w_{2,f}$ as the facilitator level f.

$$f = w_{1,f} f_1 + w_{2,f} f_2 \quad (4)$$

The weighting factors $w_{1,f}$ and $w_{2,f}$ are positive real number values and the sum $w_{1,f} + w_{2,f}$ thereof is 1. Accordingly, the facilitator level f ranges from 0 to 1.

Idea Provider Level

The method of calculating an idea provider level g will be described below.

For example, the idea provider level calculating unit 154 calculates an amount of speech of another speaker in a predetermined period before speech for each utterance of the speakers and normalized amounts of speech $a_1$ and $a_2$ by dividing the amount of speech of another speaker in the predetermined period before speech by the predetermined period. The speech times are used as the amounts of speech before normalization. Accordingly, the normalized amounts of speech $a_1$ and $a_2$ have values ranging from 0 to 1, respectively.

The idea provider level calculating unit 154 calculates a conversation activity increasing rate $g_1$ by adding ½ to a value obtained by dividing a difference between the normalized amounts of speech $a_2$ and $a_1$ by 2 as expressed by Equation (5).

The conversation activity increasing rate $g_1$ is a component of the idea provider level g. The conversation activity increasing rate $g_1$ is also normalized to have a value ranging from 0 to 1.

$$g_1 = \frac{a_2 - a_1}{2} + \frac{1}{2} \quad (5)$$

The idea provider level calculating unit 154 calculates a normalized non-conversation time $g_2$, for example, by dividing the total sum of non-conversation times between neighboring utterances of each speaker in a meeting to be analyzed by a meeting time which is a section to be analyzed. The non-conversation time $g_2$ is a negative component of the idea provider level g. The normalized non-conversation time $g_2$ also ranges from 0 to 1.

For example, the idea provider level calculating unit 154 counts the number of utterances including predetermined keywords included in a conclusion sentence among the utterances of the speakers in a meeting to be analyzed as a conclusion mention level before normalization. The idea provider level calculating unit 154 calculates a normalized conclusion mention level $g_3$ by dividing the counted conclusion mention level by the speech frequency of the corresponding speaker in the meeting.

The conclusion mention level $g_3$ is a component of the idea provider level g. The normalized conclusion mention level $g_3$ also ranges from 0 to 1.

As expressed by Equation (6), the idea provider level calculating unit 154 calculates multiplied values $w_{1,g} \cdot g_1$, $w_{2,g} \cdot g_2$, and $w_{3,g} \cdot g_3$ by multiplying the conversation activity increasing rate $g_1$, the non-conversation time $g_2$, and the conclusion mention level $g_3$ by predetermined weighting factors $w_{1,g}$, $w_{2,g}$, and $w_{3,g}$, respectively. The idea provider level calculating unit 154 calculates the idea provider level g by deducting $w_{2,g} \cdot g_2$ from the sum of the multiplied values $w_{1,g} \cdot g_1$ and $w_{3,g} \cdot g_3$.

$$g = w_{1,g} \cdot g_1 - w_{2,g} \cdot g_2 + w_{3,g} \cdot g_3 \quad (6)$$

The weighting factors $w_{1,g}$, $w_{2,g}$, and $w_{3,g}$ are positive real number values. When the value of the idea provider level g obtained using the relationship expressed by Equation (6) is greater than 1, the idea provider level calculating unit 154 sets the idea provider level g to 1. When the value of the idea provider level g obtained using the relationship expressed by Equation (6) is less than 0, the idea provider level calculating unit 154 sets the idea provider level g to 0. Accordingly, the idea provider level ranges from 0 to 1.

In the idea provider level calculating unit 154, the weighting factors $w_{1,g}$, $w_{2,g}$, and $w_{3,g}$ may be set in advance such that $w_{1,g} - w_{2,g} + w_{3,g}$ is equal to 1. Accordingly, a possibility that the value of the idea provider level g obtained using the relationship expressed by Equation (6) will be less than 0 and a possibility that the value of the idea provider level g will be greater than 1 decrease.

Dominator Level

Figure 7:
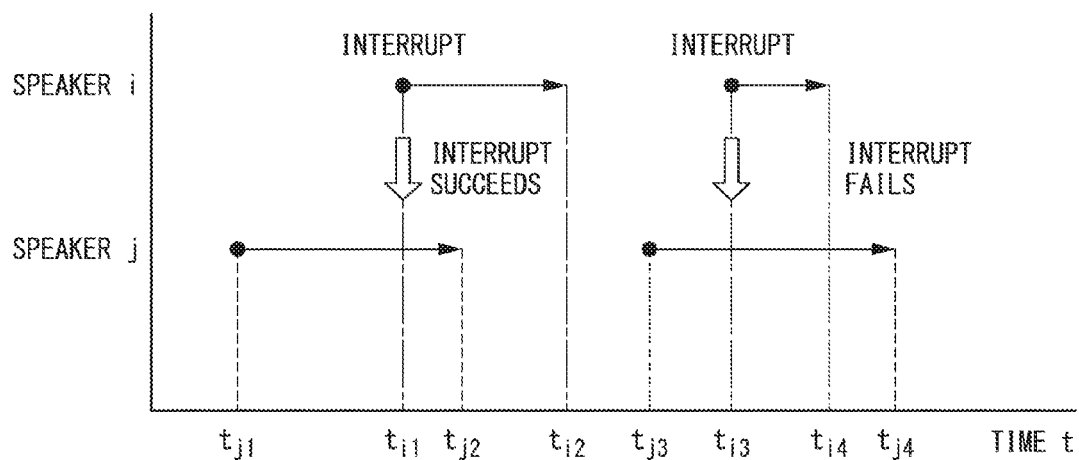
FIG. 7 is a diagram illustrating whether interruption is successful.

An interrupt will be first described and then the method of calculating a dominator level will be described. An interrupt means that a speaker i starts speech while another speaker j gives speech. In the example illustrated in FIG. 7, the start of speech of the speaker i at time $t_{i1}$ while the speaker j gives speech from time $t_{j1}$ to time $t_{j2}$ is determined to be an interrupt. In addition, the start of speech of the speaker i at time $t_{i3}$ while the speaker j gives speech from time $t_{j3}$ to time $t_{j4}$ is determined to be an interrupt.

The dominator level calculating unit 155 determines that the interrupt succeeds when the interrupted speech which is earlier started ends earlier than the interrupting speech. On the other hand, the dominator level calculating unit 155 determines that the interrupt fails when the interrupting speech ends earlier than the interrupted speech. In the example illustrated in FIG. 7, the end time $t_{j2}$ of the interrupted speech of the speaker j is earlier than the end time $t_{i2}$ of the interrupting speech of the speaker i. Accordingly, the dominator level calculating unit 155 determines that the speech of the speaker i ending at the end time $t_{i2}$ is a successful interrupt. On the other hand, the end time $t_{i4}$ of the interrupting speech of the speaker i is earlier than the end time $t_{j4}$ of the interrupted speech of the speaker j. Accordingly, the dominator level calculating unit 155 determines that the speech of the speaker i ending at the end time $t_{i4}$ is a failed interrupt.

Speech of which the speech time is shorter than a predetermined threshold value for the speech time (for example, the lower limit $d_{th}$ of the speech time) among utterances of a speaker i starting during speech of another speaker j is not employed as interrupting speech by the dominator level calculating unit 155. This is because such speech does not directly contribute to a discussion.

The method of calculating a dominator level will be described below. First, the dominator level calculating unit 155 counts a successful interrupt frequency $I_i^{ok}$ in which speech of a speaker i to be calculated successfully interrupts speech of another speaker j and a failed interrupt frequency $I_i^{ng}$ in which speech of a speaker i to be calculated fails to interrupt speech of another speaker j on the basis of a speech section of the speaker i to be calculated and speech sections of all the other speakers j ($j \ne i$). Another speaker j is all speakers other than the speaker i among the speakers participating in a meeting, but does not mean a specific single speaker. An interrupt of another speaker j by the speaker i to be calculated is generically referred to as an active interrupt. The dominator level calculating unit 155 adds the successful interrupt frequency $I_i^{ok}$ and the failed interrupt frequency $I_i^{ng}$ to calculate an active interrupt frequency $I_i$ of the speaker i.

The dominator level calculating unit 155 counts a successful interrupt frequency $I_j^{ok}$ in which speech of another speaker j successfully interrupts speech of a speaker i to be calculated and a failed interrupt frequency $I_j^{ng}$ in which speech of another speaker j fails to interrupt speech of a speaker i to be calculated. An interrupt of a speaker i to be calculated by another speaker j is generically referred to as a passive interrupt. The dominator level calculating unit 155 adds the successful interrupt frequency $I_j^{ok}$ and the failed interrupt frequency $I_j^{ng}$ to calculate a passive interrupt frequency $I_j$ of the speaker i.

As expressed by Equation (7), the dominator level calculating unit 155 adds a ratio of the successful interrupt frequency $I_i^{ok}$ in which the speech of the speaker i successfully interrupts the speech of the speaker j to the active interrupt frequency $I_i$ and a ratio of the failed interrupt frequency $I_i^{ng}$ in which the speech of the speaker j fails to interrupt the speech of the speaker i to the passive interrupt frequency $I_j$ to calculate an effective interrupt ratio $h_1$. The effective interrupt ratio $h_1$ is a component of the dominator level. The effective interrupt ratio $h_1$ ranges from 0 to 1.

$$h_1 = \frac{I_i^{ok}}{I_i} + \frac{I_j^{ng}}{I_j} \quad (7)$$

As expressed by Equation (8), the dominator level calculating unit 155 adds a ratio of the failed interrupt frequency $I_i^{ng}$ in which the speech of the speaker i fails to interrupt the speech of the speaker j to the active interrupt frequency $I_i$ and a ratio of the successful interrupt frequency $I_j^{ok}$ in which the speech of the speaker j successfully interrupts the speech of the speaker i to the passive interrupt frequency $I_j$ to calculate an effective interrupted ratio $h_2$. The effective interrupted ratio $h_2$ is a negative component of the dominator level.

The effective interrupted ratio $h_2$ ranges from 0 to 1. The total sum of the effective interrupt ratios $h_1$ of the speakers and the total sum of the effective interrupted ratio $h_2$ are equal to each other by the relationship between interrupting and interrupted.

$$h_2 = \frac{I_i^{ng}}{I_i} + \frac{I_j^{ok}}{I_j} \quad (8)$$

The dominator level calculating unit 155 calculates an interrupt activity rate $h_3$ by dividing the total sum of the amounts of speech of other speakers j within a predetermined time from an end of interrupting speech of the speaker i by the interrupting speech frequency within a predetermined period. The interrupt activity rate $h_3$ refers to a degree by which a conversation is activated by the interrupting speech. The interrupt activity rate $h_3$ is another component of the dominator level. The interrupt activity rate $h_3$ ranges from 0 to 1. The interrupt activity rate $h_3$ may be calculated in the same way as the conversation activity increasing rate $g_1$ expressed by Equation (5).

The dominator level calculating unit 155 calculates multiplied values $w_{1,h} \cdot h_1$, $w_{2,h} \cdot h_2$, and $w_{3,h} \cdot g_3$ by multiplying the effective interrupt ratio $h_1$, the effective interrupted ratio $h_2$, and the interrupt activity rate $h_3$ by predetermined weighting factors $w_{1,h}$, $w_{2,h}$, and $w_{3,h}$, respectively, as expressed by Equation (9). The dominator level calculating unit 155 deducts the multiplied value $w_{2,h} \cdot h_2$ from the sum of the multiplied values $w_{1,h} \cdot h_1$ and $w_{3,h} \cdot g_3$ to calculate a dominator level h.

$$h = w_{1,h} h_1 - w_{2,h} h_2 + w_{3,h} h_3 \quad (9)$$

The weighting factors $w_{1,h}$, $w_{2,h}$, and $w_{3,h}$ are positive real number values. Here, when the value of the dominator level h obtained using the relationship expressed by Equation (9) is greater than 1, the dominator level calculating unit 155 sets the dominator level h to 1. When the value of the dominator level h obtained using the relationship expressed by Equation (9) is less than 0, the dominator level calculating unit 155 sets the dominator level h to 0. Accordingly, the dominator level h ranges from 0 to 1.

In the dominator level calculating unit 155, the weighting factors $w_{1,h}$, $w_{2,h}$, and $w_{3,h}$ may be set in advance such that $w_{1,h} - w_{2,h} + w_{3,h}$ is equal to 1. Accordingly, a possibility that the value of the dominator level h obtained using the relationship expressed by Equation (9) will be less than 0 and a possibility that the value of the dominator level h will be greater than 1 decrease.

The facilitator level f, the idea provider level g, and the dominator h which are calculated by the above-mentioned methods are normalized to range from 0 to 1. Accordingly, the role determining unit 160 can justly determine the role of each speaker by directly comparing the facilitator level f, the idea provider level g, and the dominator level h which are calculated for each speaker.

A case in which the role determining unit 160 determines the role of each speaker over the whole conversation has been described above, but the role determining unit 160 may determine the role of each speaker over a part of the conversation. A part of the conversation may be each of a predetermined number of parts into which the conversation is divided, for example, each of an earlier part, a middle part, and a latter part, or may be periods into which the conversation is divided by a predetermined time (for example, 15 minutes to 1 hour). Accordingly, for each part of the conversation, the speech amount calculating unit 151 can calculate an amount of speech and an average speech time of each speaker, the facilitator level calculating unit 153 can calculate a facilitator level, the idea provider level calculating unit 154 can calculate an idea provider level, and the dominator level calculating unit 155 can calculate a dominator level. The facilitator level calculating unit 153 does not use the variance $v_n$ in another part of the current conversation but uses the variance $v_n$ in a previous conversation to calculate the speech amount correction level $f_1$ which is a component of the facilitator level.

Display Information

Figure 8:
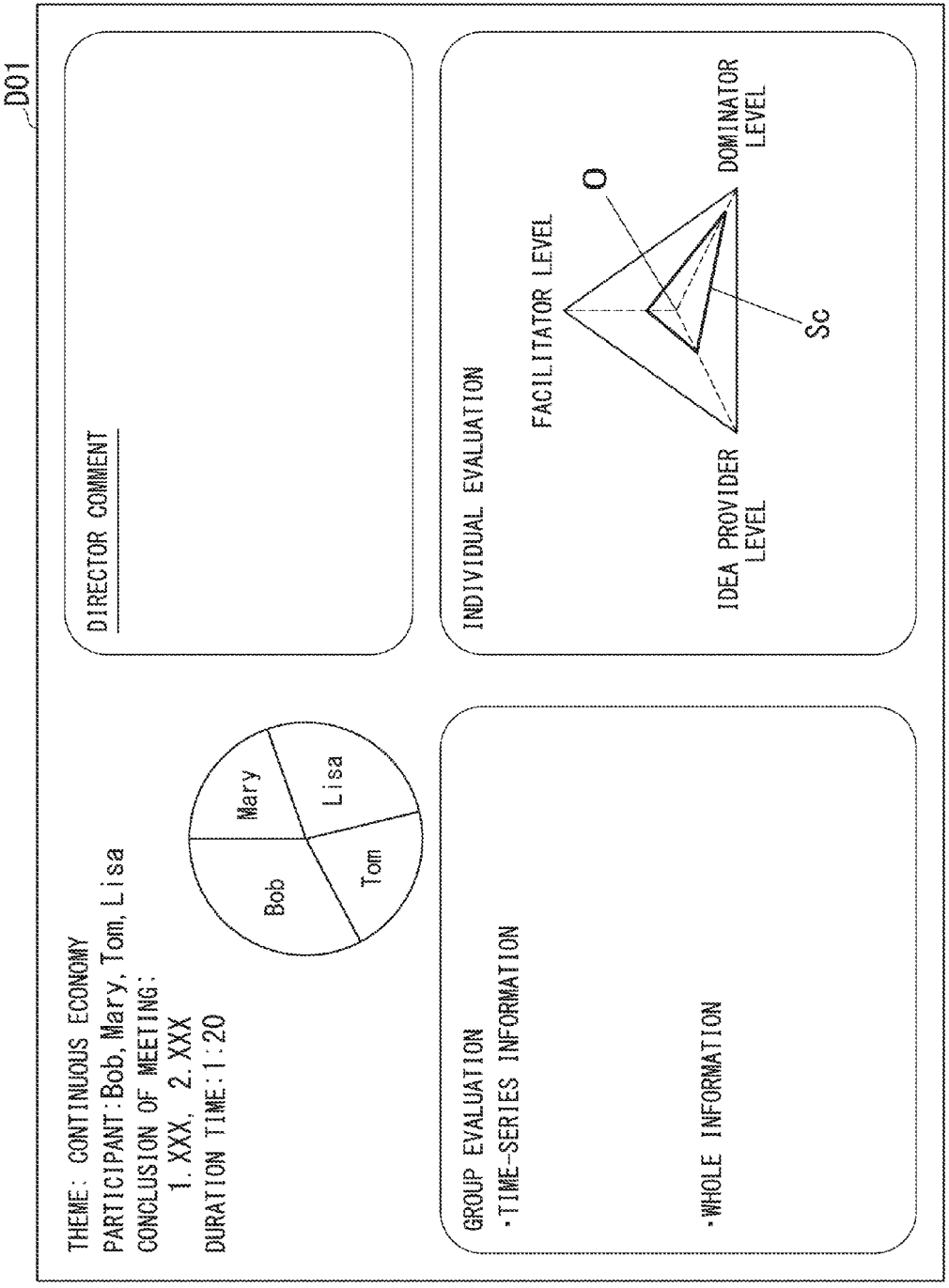
FIG. 8 is a diagram illustrating an example of display information according to the embodiment.

An example of display information which is displayed on the display unit 40 on the basis of display data from the display data acquiring unit 180 will be described below. FIG. 8 illustrates a display screen D01 which is an example of the display information according to this embodiment.

The display screen D01 is a screen for mainly displaying an evaluation result of a conversation. The display screen D01 includes a theme, participants, a conclusion of a meeting, a duration time, and group evaluation as information of a whole conversation. The theme represents a subject or a title of the conversation. The participants represent names of speakers participating in the conversation. In the example illustrated in FIG. 8, there are four participants of "Bob," "Mary," "Tom," and "Lisa." The conclusion of a meeting represents details derived as a conclusion of the conversation. The duration time is a time in which the conversation is carried out. A pie chart illustrated on the right side of the duration time represents collectively domination rates of the participants by area ratios thereof. The domination rate refers to a ratio of an amount of speech of each participant in the meeting to the total amount of speech of all the participants.

Time-series information and the whole information are illustrated as the group evaluation. In the example illustrated in FIG. 8, the time-series information and the whole information are not illustrated. Examples of the time-series information and the whole information will be described later. A part or all of information indicating a conversation state is included as information constituting the time-series information and the whole information. The information indicating the conversation state includes a domination rate, an interrupt, a speech frequency, role sharing, and a non-speech time. The conversation state evaluating unit 170 may employ or totalize values calculated in the course of calculating the speech time of the conversation, the facilitator level, the idea provider level, and the dominator level when acquiring the information indicating the conversation state.

The display screen D01 additionally includes a display field of a director comment and an individual evaluation field. A text indicating a comment which is input from the operation input unit 30 by an operation of a user having reading the analysis result of the conversation is displayed as the director comment. In the individual evaluation field, a radar chart collectively illustrating magnitudes of a facilitator level, an idea provider level, and a dominator level is displayed as index values in the conversation of the speaker designated by an operation signal which is input from the operation input unit 30 by a user's operation. The magnitudes of the facilitator level, the idea provider level, and the dominator level of a speaker are displayed by distances from an origin O to vertices of a triangle indicated by a solid line Sc. Accordingly, in addition to the magnitudes of the facilitator level, the idea provider level, and the dominator level, the balance of the magnitudes is intuitively understood by the user. Accordingly, the user can easily analyze contribution or tendency of a speaker to the conversation.

As the domination rate which is an index of the information indicating a conversation state and which is calculated by the conversation state evaluating unit 170, information of a domination rate of each speaker in the whole conversation may be included or information of a domination rate of each speaker for every predetermined time (for example, 5 minutes to 15 minutes) may be included. As the interrupt, information of an interrupt time, a speaker of interrupting speech, and a speaker of interrupted speech is included. As the speech frequency, information of a speech frequency of each speaker in the whole conversation may be included or information of a speech frequency of each speaker for every predetermined time may be included. As the role sharing, a role of each speaker in the whole conversation may be included or a role of each speaker for every predetermined time may be included. As the non-speech time, information of a non-speech time of each speaker in the whole conversation may be included or information of a non-speech time of each speaker for every predetermined time may be included.

When a sound-source voice signal for each speaker is included in conversation data, the conversation state evaluating unit 170 may calculate a degree of excitation of a meeting for every predetermined time with reference to the conversation data. The conversation state evaluating unit 170 counts a frequency in which the calculated degree of excitation is greater than a predetermined threshold value for the degree of excitation as an excitation frequency. The counted excitation frequency may be included as the information indicating the conversation state. The degree of excitation is an index indicating a degree of alternation of speakers as conversation activity. The conversation state evaluating unit 170 calculates the degree of excitation d(t) on the basis of the sound-source voice signal and the speech section of each speaker indicated by the conversation data, for example, using Equation (10).

$$d(t) = \sum_l v_l e^{-\alpha(t-t_l)} \quad (10)$$

In Equation (10), t denotes time and $v_1$ denotes a relative sound volume of speech 1. The relative sound volume $v_1$ is an element indicating that the larger the sound volume of a speaker becomes, the higher the speech activity becomes. In other words, a larger sound volume means a larger degree of contribution of the speech 1. The relative sound volume $v_1$ is a sound volume which is normalized by dividing the sound volume indicated by the sound-source voice signal of each speaker by the average sound volume of the speaker in the whole conversation. $\alpha$ is an attenuation constant indicating a decrease in contribution of the speech 1 with the lapse of time from a speech start time $t_1$. The speech start time $t_1$ is specified by a speech section of each speaker. That is, the attenuation constant $\alpha$ is a coefficient indicating a decrease in activity because speakers do not alternate but speech of a specific speaker continues. Equation (10) represents that the degree of excitation f(t) is calculated by accumulating the contribution of each speech over time. Accordingly, the degree of excitation f(t) is higher as the alternation of speakers is more frequent and is lower as the alternation of speakers is less frequent. The degree of excitation f(t) is higher as the relative sound volume is larger and is lower as the relative sound volume is smaller.

Time-Series Information

Figure 9:
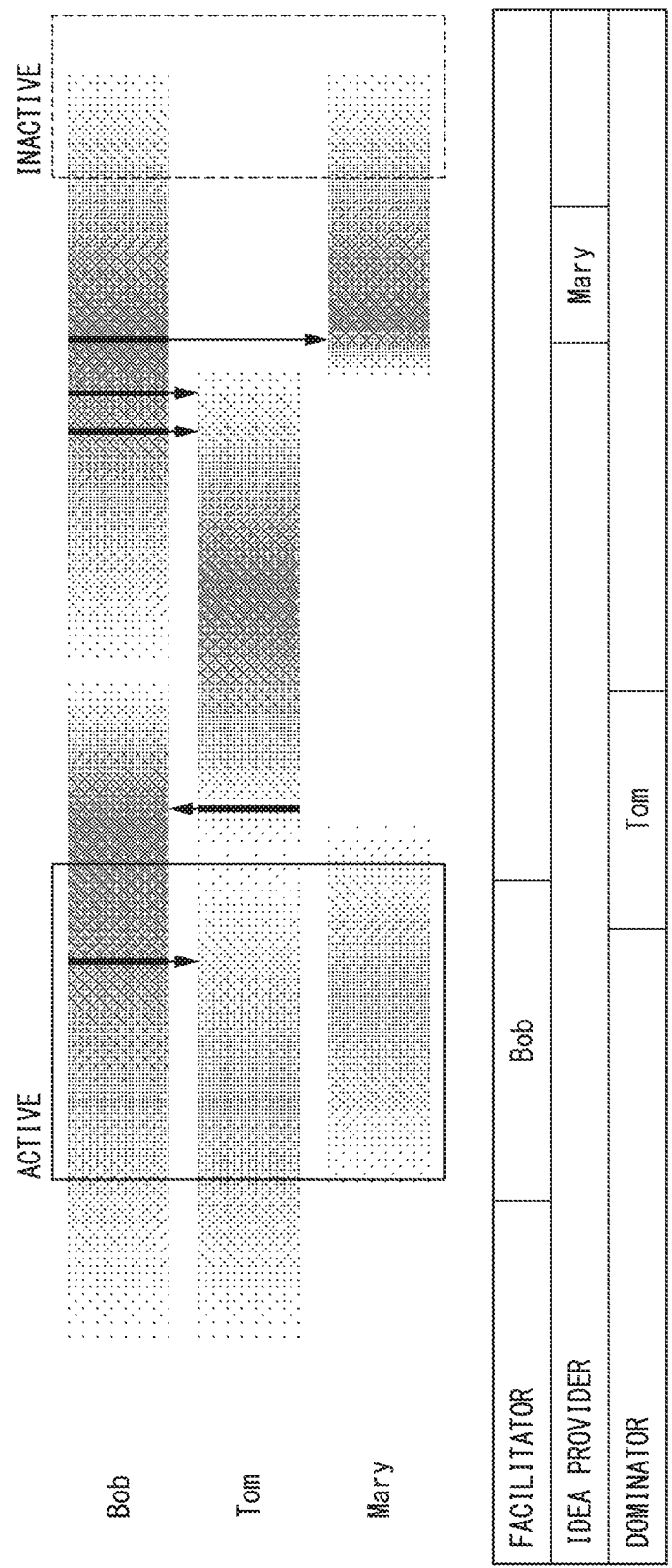
FIG. 9 is a diagram illustrating an example of time-series information according to the embodiment.

An example of time-series information constituting the display information will be described below. FIG. 9 is a diagram illustrating an example of time-series information according to this embodiment. In the example illustrated in FIG. 9, horizontally long bands indicating time series of amounts of speech of speakers are illustrated in the upper part. For each of "Bob," "Tom," and "Mary" at the left end, an amount of speech for every 5 minutes is illustrated in gray scales. The darker indicates a larger amount of speech and the brighter indicates a smaller amount of speech. The solid frame indicates an active section in which an amount of speech is relatively large in the whole conversation. The dotted frame indicates an inactive section in which an amount of speech is small in the whole conversation. Bold lines vertically crossing the bands and arrows having one end of the solid lines as a start point indicate interrupts. The start point of an arrow indicates a band of a speaker of interrupting speech and the end point of the arrow indicates a band of a speaker of interrupted speech. The position in the horizontal direction indicates the time at which the interrupt is performed. For example, the bold line and the arrow at the leftmost of the upper part indicate that the speech of "Bob" interrupts the speech of "Tom" at that time. Accordingly, a user can intuitively understand a temporal variation in the amount of speech and an interrupt state in the whole conversation and for each speaker.

In the example illustrated in FIG. 9, a temporal variation of a speaker corresponding to each role is illustrated in the lower part. The speaker who plays a role of a facilitator is "Bob" in an early part and there is no speaker corresponding to the facilitator thereafter. There is no speaker corresponding to an idea provider in the early part, "Mary" corresponds to the idea provider in the latter part of the conversation, and there is no speaker corresponding to the idea provider thereafter. There is no speaker corresponding to a dominator in the early part, and "Tom" plays a role of the dominator immediately before "Bob" finishes the role of the facilitator. Thereafter, there is no speaker corresponding to the dominator. Accordingly, a user can intuitively understand a temporal variation of the roles in the conversation.

In the example illustrated in FIG. 9, time-series information of all the participants in the conversation are illustrated, but time-series information of a specific participant may be illustrated. In this case, the display data acquiring unit 180 may specify the speaker designated by an operation signal which is input from the operation input unit 30 by a user's operation and may acquire display data including time-series information associated with the specified speaker and not including time-series information associated with other speakers.

Figure 10:
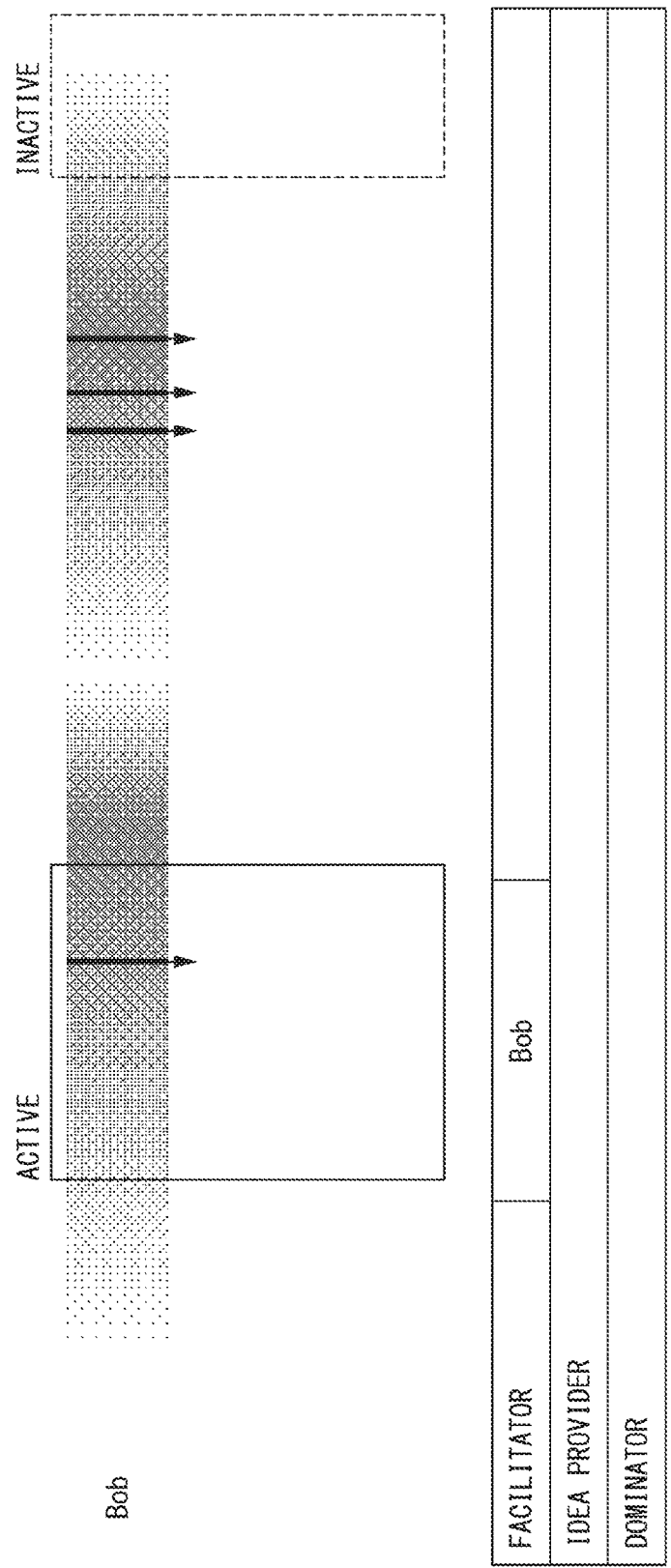
FIG. 10 is a diagram illustrating another example of time-series information according to the embodiment.

FIG. 10 is a diagram illustrating an example of time-series information of "Bob" which is a specified speaker. The time-series information illustrated in FIG. 10 includes the time-series information of "Bob" among the time-series information illustrated in FIG. 9 and does not include the time-series information of "Tom" and "Mary."

Whole Information

Figures 11, 12:
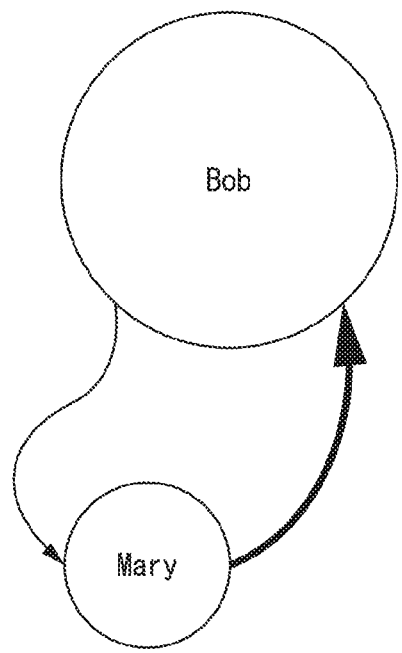
FIG. 11 is a diagram illustrating an example of total information according to the embodiment.
FIG. 12 is a diagram illustrating another example of total information according to the embodiment.

An example of whole information constituting the display information will be described below. FIG. 11 illustrates an amount of speech and an interrupt frequency of each speaker as an example of the whole information.

In the example illustrated in FIG. 11, the magnitude of the amount of speech of each speaker is indicated by a size of a circle, and a frequency of each set of an interrupting speaker and an interrupted speaker is indicated by thickness of an arrow. The larger radius of a circle means a larger amount of speech and the larger thickness of an arrow means a larger interrupt frequency. For example, "Bob" has a larger amount of speech than "Mary" and the interrupt frequency in which "Mary" interrupts "Bob" is larger than the interrupt frequency in which "Bob" interrupts "Mary."

FIG. 12 illustrates index values for each speaker as another example of the whole information. A facilitator level, an idea provider level, and a dominator level are included as the index values. In the example illustrated in FIG. 12, a ratio of each index value for each speaker is indicated by a horizontally long bar graph. The ratio of each index value is obtained by dividing the index value by the sum of three types of index values. For example, the facilitator level of "Tom" is higher than the idea provider level and the dominator level, and the idea provider level of "Bob" is higher than the facilitator level and the dominator level. Accordingly, the balance of the index values for each speaker in the conversation is intuitively understood. The number of types of diagrams displayed in the display field of whole information is not limited to one, but may be two or more. For example, both of the diagram representing an amount of speech and an interrupt frequency of each speaker in FIG. 11 and the diagram representing the index values for each speaker in FIG. 12 may be displayed.

Figure 13:
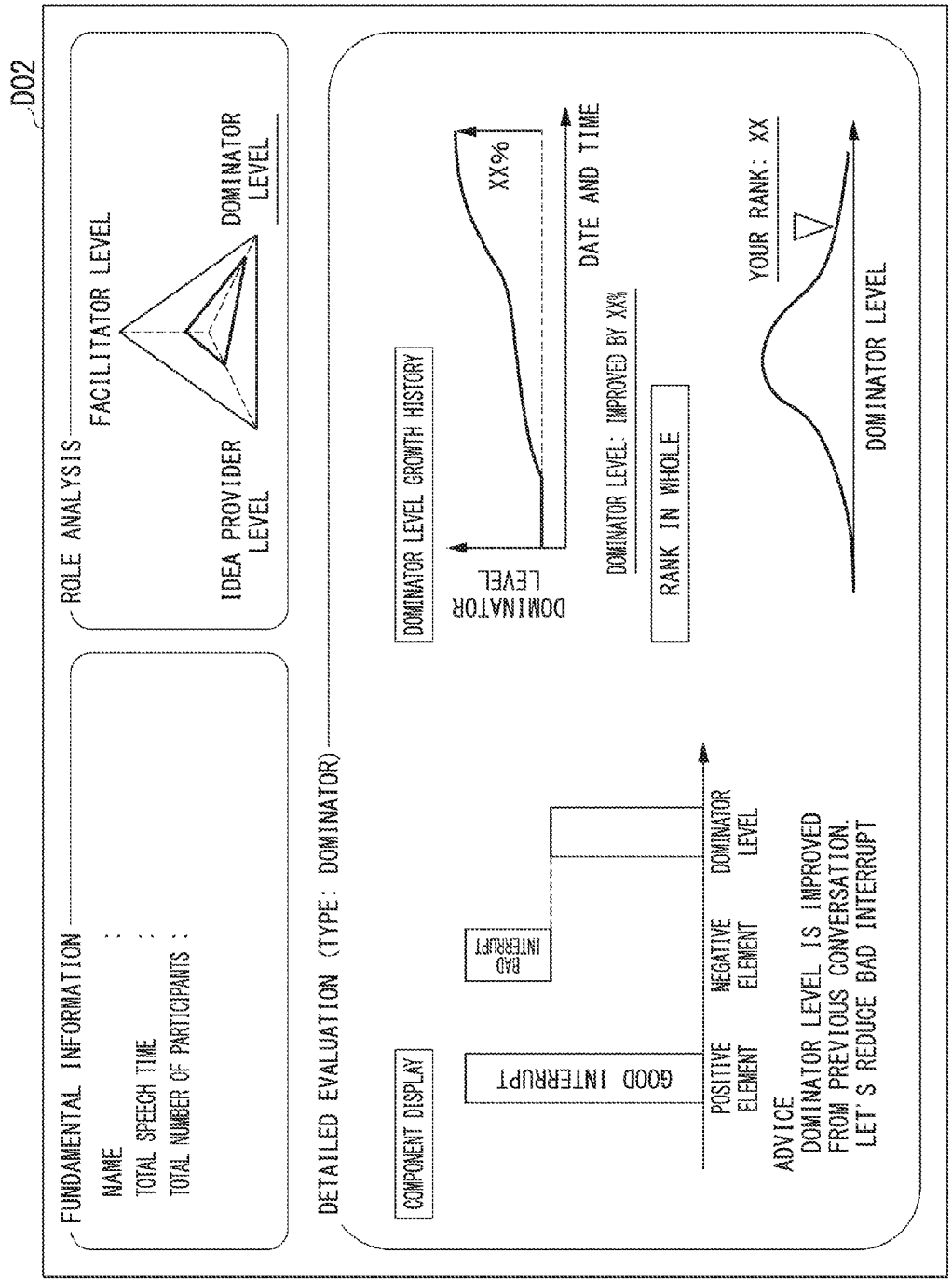
FIG. 13 is a diagram illustrating another example of display information according to the embodiment.

FIG. 13 illustrates a display screen D02 as another example of the display information according to this embodiment.

The display screen D02 is a screen for mainly displaying roles of a specific speaker and a history of an index value. The display data acquiring unit 180 specifies a speaker designated by an operation signal from the operation input unit 30 as a speaker to be displayed. The display screen D02 includes fundamental information, role analysis, and detailed evaluation of a speaker to be displayed. The fundamental information includes a name of the speaker, a total speech time in all conversations, and a total participation frequency. The role analysis includes a radar chart indicating a facilitator level, an idea provider level, and a dominator level in a latest conversation in which the speaker participates. In the radar chart, a distance from an origin to a vertex of a triangle indicated by a solid line indicates the magnitude of each index value. In the example illustrated in FIG. 13, the dominator level is higher than the facilitator level and the idea provider level which are other index values. The text of the dominator level is displayed in a more conspicuous manner than those of the facilitator level and the idea provider level. Specifically, the text of the "dominator level" is displayed with a bold line and an underline, but the text of the "facilitator level" and the text of the "idea provider level" are displayed with a normal font. Accordingly, a user can intuitively understand that the dominator level of the speaker is higher than the other index values and the speaker has a strong tendency as a dominator. In this example, the role determining unit 160 determines that the role of the speaker to be displayed is the dominator.

On the right side of the text of the detailed evaluation, a character string "(type: dominator)" is displayed as a character string indicating the role of the speaker. The detailed evaluation includes component display of the index value serving as a basis for determination of the speaker, advice, growth history, and rank in the whole. In the example illustrated in FIG. 13, information on the "domination level" is included as the index value serving as a basis for the determination of "dominator." In the component display, a positive element and a negative element of the dominator level and the dominator level are displayed by bar graphs. The positive element is expressed by a bar graph having a height which is proportional to the sum of the multiplied values $w_{1,i} \cdot h_1$ and $w_{3,i} \cdot h_3$. The positive element is based on a successful interrupt of the corresponding speaker, a failed interrupt of other speakers, and an amount of speech of the speaker and thus has the text "good interrupt" attached thereto. The negative element is expressed by a bar graph having a height which is proportional to the multiplied value $w_{2,i} \cdot h_2$. The negative element is based on a failed interrupt of the corresponding speaker and a successful interrupt of other speakers and thus has the text "bad interrupt" attached thereto. The positive element, the negative element, and the dominator level are arranged such that the height of the bottom of the bar graph of the positive element is equal to the height of the bottom of the bar graph of the dominator level and the height of the bottom of the bar graph of the negative element is equal to the height of the top of the bar graph of the dominator level. Since the height of the top of the bar graph of the negative element is equal to the height of the top of the good interrupt, a user can intuitively understood a factor contributing to the dominator level and a factor reducing the dominator level. Below the diagram of the component display, a message "the dominator level is improved from the previous conversation" with improvement in the dominator level from the previous conversation is included as the advice. This message may be a message which is selected from a plurality of preset candidate messages on the basis of components and a variation tendency of the index value associated with the role of the speaker to be displayed by the conversation state evaluating unit 170. In the data storage unit 130, the candidate messages are stored in correlation with the ratios of the components of the index values and the variation tendency of the index values.

As the growth history of the dominator level, the dominator level for each date and time at which a conversation is carried out is expressed by a line graph.

The dotted line indicates the dominator level in the initial conversation, and XX % indicates an increasing rate from the dominator level in the initial conversation to the dominator level in the latest conversation. The text "dominator level: XX % improved" in the lowest row of the display field of dominator level growth history is a message indicating that the dominator level increases by XX % from the initial conversation.

As the rank in the whole, a headcount distribution of the dominator levels of all the speakers is expressed by a line graph. The lower vertex of a mark ∇ indicates the rank of the speaker to be displayed. The rank indicates the relative magnitude of the dominator level to the dominator level distribution of all the speakers. The rank may be a value obtained by discretizing the dominator level into a predetermined number of steps or may be a ranking. All the speakers are not limited to the latest conversation but mean the speakers of all conversations which have been carried out up to that time. Accordingly, the relative position of the dominator level to be displayed with respect to the distribution of all the speakers can be intuitively understood.

As described above, the conversation analyzing device 10 according to this embodiment includes the conversation data acquiring unit 120 configured to acquire conversation data indicating speech of each speaker in a conversation. The conversation analyzing device 10 includes the conversation state analyzing unit 150 configured to analyze an amount of speech of each speaker in the conversation and a degree of influence of the speech of each speaker on the conversation on the basis of the conversation data. The conversation analyzing device 10 includes the role determining unit 160 configured to determine a role of each speaker in the conversation on the basis of the amount of speech and the degree of influence of the speaker.

According to this configuration, the role of each speaker is determined on the basis of the amount of speech and the degree of influence which are quantitative index values of the speech of each speaker in a conversation. Accordingly, the role of each speaker is objectively determined. An operation for determination can be released or reduced.

The index value of the degree of influence includes a facilitator level which is a degree by which speech of a speaker is facilitated, and the role determining unit 160 determines whether the role of a speaker is a facilitator on the basis of the facilitator level.

According to this configuration, it is determined whether the role of each speaker is a facilitator on the basis of the degree by which speech is facilitated. Accordingly, it is possible to objectively determine whether the role of each speaker is a facilitator facilitating speech of another speaker.

The facilitator level is an index value including a speech amount correction level which is a degree by which a deviation in the amount of speech among the speakers is lessened as a component thereof.

According to this configuration, it is determined whether the role of each speaker is a facilitator on the basis of the degree by which a deviation in the amount of speech among the speakers is lessened. Accordingly, it is possible to accurately determine whether the role of each speaker is a facilitator relaxing a deviation among the speakers.

The facilitator level is an index value including a conversation facilitation frequency which is a speech frequency for facilitating the conversation as a component thereof.

According to this configuration, it is determined whether the role of each speaker is a facilitator on the basis of the speech frequency for facilitating the conversation. Accordingly, it is possible to accurately determine whether the role of each speaker is a facilitator facilitating the conversation.

The index value of the degree of influence includes an idea provider level including a conversation activity increasing rate which is a degree by which the conversation is activated by speech as a component. The role determining unit 160 determines whether the role of each speaker is an idea provider on the basis of the idea provider level.

According to this configuration, it is determined whether the role of each speaker is an idea provider on the basis of the degree by which the conversation is activated by speech of the speaker. Accordingly, it is possible to accurately determine whether the role of each speaker is an idea provider giving speech for activating the conversation.

The idea provider level includes a conclusion mention level which is a mention frequency of a conclusive element of the conversation as a component.

According to this configuration, it is determined whether the role of each speaker is an idea provider on the basis of the mention frequency of a conclusive element of the conversation. Accordingly, it is possible to accurately determine whether the role of each speaker is an idea provider giving speech for deriving the conclusive element of the conversation.

The index value of the degree of influence includes a dominator level indicating an interruption state of speech of another speaker. The role determining unit 160 determines whether the role of each speaker is a dominator on the basis of the dominator level.

According to this configuration, it is determined whether the role of each speaker is a dominator on the basis of the interruption state of speech of another speaker. Accordingly, it is possible to accurately determine whether the role of each speaker is a dominator dominating a discussion in the conversation.

The conversation analyzing device 10 includes the display data acquiring unit 180 configured to output display data including a diagram collectively indicating magnitudes of index values of the degree of influence and a diagram illustrating a ratio of an amount of speech for each speaker to the display unit 40.

According to this configuration, the diagram collectively indicating magnitudes of the index values of the degree of influence and the diagram illustrating a ratio of an amount of speech for each speaker are displayed. Accordingly, a user can efficiently analyze a role or a tendency in a conversation with reference to the degree of influence of each speaker on the conversation and an amount of speech of each speaker. For example, selection of a speaker or training of a speaker for conversations can be efficiently performed on the basis of analysis.

The conversation analyzing device 10 includes the sound collecting unit 20 configured to acquire a plurality of channels of voice signals and the sound source separating unit 122 configured to separate voice signals associated with speech of each speaker from the plurality of channels of voice signals.

According to this configuration, it is possible to acquire voice signals associated with speech of each speaker. Accordingly, it is possible to determine a role based on speech of each speaker in a conversation without causing each speaker to carry a sound collecting unit.

While embodiments of the invention have been described with reference to the drawings, the specific configurations are not limited to the above-mentioned, but various modifications design and the like can be made without departing from the gist of the invention.

For example, in the conversation analyzing system 1, the number of sound collecting units 20 may be two or more. In this case, the conversation data acquiring unit 120 may acquire voice signals acquired by the sound collecting units 20 as sound-source voice signals. In this case, the sound source localizing unit 121 and the sound source separating unit 122 may be skipped. Each sound collecting unit 20 is not limited to the microphone array as long as it can acquire a one channel of voice signal indicating voice of each speaker.

The conversation data may not include speech details of each speech section as long as it includes the speech sections of each speaker. In this case, the feature calculating unit 124 and the voice recognizing unit 125 may be skipped. The facilitator level calculating unit 153 does not calculate the conversation facilitation speech frequency $f_2'$ but calculates the speech amount correction level $f_1'$ as the facilitator level f. The idea provider level calculating unit 154 does not calculate the conclusion mention level $g_3$ but calculates the idea provider level g by deducting the multiplied value $w_{2,g} \cdot g_2$ from the multiplied value $w_{1,g} \cdot g_1$. Here, $w_{1,g} - w_{2,g}$ is equal to 1.

The idea provider level calculating unit 154 sets the idea provider level g to 1 when $w_{1,g} \cdot g_1 - w_{2,g} \cdot g_2$ is greater than 1, and sets the idea provider level g to 0 when $w_{1,g} \cdot g_1 - w_{2,g} \cdot g_2$ is less than 0.

The idea provider level calculating unit 154 may not calculate the non-conversation time $g_2$ but may calculate the conversation activity increasing rate $g_1$ as the idea provider level.

The dominator level calculating unit 155 may not calculate the interrupt activation rate $h_3$ but may calculate the dominator level h by deducting the multiplied value $w_{2,h} \cdot h_2$ from the multiplied value $w_{1,h} \cdot h_1$. Here, $w_{1,h} - w_{2,h}$ is equal to 1. The dominator level calculating unit 155 may set the dominator level h to 1 when $w_{1,h} \cdot h_1 - w_{2,h} \cdot h_2$ is greater than 1, and may set the dominator level h to 0 when $w_{1,h} \cdot h_1 - w_{2,h} \cdot h_2$ is less than 0.

In the processes associated with the determination of a role and illustrated in FIG. 3, the role determining unit 160 determines the role of a speaker as a core member to be any one of a facilitator, an idea provider, and a dominator, but the invention is not limited this example. The role determining unit 160 may determine whether the role of the speaker is a facilitator, an idea provider, or a dominator depending on whether the facilitator level, the idea provider level, and the dominator level which are calculated for each speaker are greater than the threshold values for role determination of the index values, respectively. Accordingly, when a speaker plays a plurality of roles, for example, when a speaker corresponds to both a facilitator and an idea provider, the role of the speaker is determined without excluding such a possibility. The threshold values for role determination may be greater than the threshold values used in Step S104.

The role determining unit 160 may determine that the role of a speaker of which the amount of speech is equal to or less than a predetermined threshold value for the amount of speech and in which any one of the facilitator level, the idea provider level, and the dominator level is higher than the corresponding threshold value is an authority.

When the conversation data acquiring unit 120 can acquire conversation data generated by another device via the input/output unit 110, the sound source localizing unit 121, the sound source separating unit 122, the speech section detecting unit 123, the feature calculating unit 124, the voice recognizing unit 125, and the sound collecting unit 20 may be skipped.

The conversation analyzing device 10 may be incorporated into any one or a combination of the sound collecting unit 20, the operation input unit 30, and the display unit 40 to constitute a single conversation analyzing device.

A part of the conversation analyzing device 10 according to the above-mentioned embodiment, for example, the conversation data acquiring unit 120 and the control unit 140, may be embodied by a computer. In this case, such a control function may be realized by recording a program for embodying the control function on a computer-readable recording medium and causing a computer system to read and execute the program recorded on the recording medium. The program for realizing the conversation data acquiring unit 120 and the program for realizing the control unit 140 may be independent of each other. The "computer system" mentioned herein is a computer system built in the conversation analyzing device 10 and includes an operating system (OS) or hardware such as peripherals. Examples of the "computer-readable recording medium" include a portable medium such as a flexible disk, a magneto-optical disk, a ROM, or a CD-ROM and a storage device such as a hard disk built in the computer system. The "computer-readable recording medium" may include a medium that dynamically holds a program for a short time like a communication line when a program is transmitted via a network such as the Internet or a communication line such as a telephone circuit or a medium that holds a program for a predetermined time like a volatile memory in a computer system serving as a server or a client in that case. The program may serve to realize a part of the above-mentioned functions. The program may serve to realize the above-mentioned functions in combination with another program stored in advance in the computer system.

All or a part of the conversation analyzing device 10 according to the above-mentioned embodiments and modified examples may be embodied by an integrated circuit such as a large scale integration (LSI). The functional blocks of the conversation analyzing device 10 may be independently made into individual processors, or all or part thereof may be integrated as a processor. The circuit integrating technique is not limited to the LSI, but a dedicated circuit or a general-purpose processor may be used. When a circuit integrating technique capable of substituting the LSI appears with advancement of semiconductor technology, an integrated circuit based on the technique may be used.

What is claimed is:

1. A conversation analyzing device comprising:
   a conversation data acquiring unit, implemented via at least one processor, configured to acquire conversation data indicating speech of each of a plurality of speakers in a conversation;
   a conversation state analyzing unit, implemented via the at least one processor, configured to analyze an amount of speech of each of the plurality of speakers in the conversation and a degree of influence of the speech of each of the plurality of speakers on the conversation based on the conversation data;
   and a role determining unit, implemented via the at least one processor, configured to determine a role of each of the plurality of speakers in the conversation based on the amount of speech and the degree of influence of the speaker,
   wherein the degree of influence includes a facilitator level index value, the facilitator level index value being indicative of a degree to which one of the speakers facilitates speech of other speakers in the conversation and includes as a component thereof a speech amount correction level, the speech amount correction level being indicative of a degree to which a deviation in the amount of speech among the plurality of speakers is lessened and a degree to which the amount of speech of other speakers is corrected by the one speaker from a natural state to an ideal state, wherein the natural state is an average amount of speech of the other speakers in a previous conversation and the ideal state is a state in which amounts of speech of each of the plurality of speakers are equal to each other in a current conversation,
   the role determining unit determines whether the role of the one speaker is a facilitator based on the facilitator level index value;
   and a display unit to output image data including data representing the determination of whether the role of the speaker is a facilitator.

2. The conversation analyzing device according to claim 1, wherein the facilitator level index value includes as a component thereof a conversation facilitation frequency which is a speech frequency for facilitating the conversation.

3. The conversation analyzing device according to claim 1, wherein the degree of influence includes an idea provider level index value including a conversation activity increasing rate which is a degree to which the conversation is activated by speech as a component, and
   the role determining unit determines whether the role is an idea provider based on idea provider level index value.

4. The conversation analyzing device according to claim 3, wherein the idea provider level index value includes a conclusion mention level which is a mention frequency of a conclusive element of the conversation as a component.

5. The conversation analyzing device according to claim 1, wherein the degree of influence includes a dominator level index value indicating an interruption state of speech of another speaker, and the role determining unit determines whether the role is a dominator on the basis of the dominator level index value.

6. The conversation analyzing device according to claim 1, further comprising a display data acquiring unit, implemented via at least one processor and a display, configured to output display data, via the display, including a diagram collectively indicating magnitudes of index values of the degree of influence, including at least the facilitator level index value, and a diagram illustrating a ratio of an amount of speech for each of the plurality of speakers.

7. The conversation analyzing device according to claim 1, further comprising:

a sound collecting unit configured to acquire a plurality of channels of voice signals; and a sound source separating unit, implemented via the at least one processor, configured to separate voice signals associated with speech of each speaker from the plurality of channels of voice signals.

8. A conversation analyzing method in a conversation analyzing device, implemented via at least on one processor, the method comprising:

a conversation data acquiring step of acquiring conversation data indicating speech of each of a plurality of speakers in a conversation;

a conversation state analyzing step of analyzing an amount of speech of each of the plurality of speakers in the conversation and a degree of influence of the speech of each of the plurality of speakers on the conversation based on the conversation data, wherein the degree of influence includes a facilitator level index value, the facilitator level index value being indicative of a degree to which one of the speakers facilitates speech of other speakers in the conversation and includes as a component thereof a speech amount correction level, the speech amount correction level being indicative of a degree to which a deviation in the amount of speech among the plurality of speakers is lessened and a degree to which the amount of speech of other speakers is corrected by the one speaker from a natural state to an ideal state, wherein the natural state is an average amount of speech of the other speakers in a previous conversation and the ideal state is a state in which amounts of speech of each of the plurality of speakers are equal to each other in a current conversation;

a role determining step of determining a role of each of the plurality of speakers in the conversation based on the amount of speech and the degree of influence of the speaker, including determining whether the role of the one speaker is a facilitator based on the facilitator level index value;

and presenting on a display output data including data representing the determination of whether the role of the speaker is a facilitator.

9. The conversation analyzing method of claim 8, further comprising:

a display data acquiring step of outputting display data, via a display, including a diagram collectively indicating magnitudes of index values of the degree of influence, including at least the facilitator level index value, and a diagram illustrating a ratio of an amount of speech for each of the plurality of speakers.

10. A program stored on a non-transitory computer readable medium which, when executed by a processor of a computer, causes the computer to perform:

a conversation data acquiring sequence of acquiring Conversation data indicating speech of each of a plurality of speakers in a conversation;

a conversation state analyzing sequence of analyzing an amount of speech of each of the plurality of speakers in the conversation and a degree of influence of the speech of each of the plurality of speakers on the conversation based on the conversation data, wherein the degree of influence includes a facilitator level index value, the facilitator level index value being indicative of a degree to which one of the speakers facilitates speech of other speakers in the conversation and includes as a component thereof a speech amount correction level, the speech amount correction level being indicative of a degree to which a deviation in the amount of speech among the plurality of speakers is lessened and a degree to which the amount of speech of other speakers is corrected by the one speaker from a natural state to an ideal state, wherein the natural state is an average amount of speech of the other speakers in a previous conversation and the ideal state is a state in which amounts of speech of each of the plurality of speakers are equal to each other in a current conversation;

a role determining sequence of determining a role of each of the plurality of speakers in the conversation based on the amount of speech and the degree of influence of the speaker, including determining Whether the role of the one speaker is a facilitator based on the facilitator level index value;

and presenting on a display output data including data representing the determination of whether the role of the speaker is a facilitator.

11. The program according to claim 10, further comprising:

a display data acquiring sequence of outputting display data, via a display, including a diagram collectively indicating magnitudes of index values of the degree of influence, including at least the facilitator level index value, and a diagram illustrating a ratio of an amount of speech for each of the plurality of speakers.

* * * * *